US007902509B2

(12) United States Patent
Shimoi et al.

(10) Patent No.: US 7,902,509 B2
(45) Date of Patent: Mar. 8, 2011

(54) PHOTOMULTIPLIER TUBE AND RADIATION DETECTING DEVICE

(75) Inventors: Hideki Shimoi, Hamamatsu (JP); Katsuma Nagai, Hamamatsu (JP); Hiroyuki Kyushima, Hamamatsu (JP)

(73) Assignee: Hamamatsu Photonics K.K., Hamamatsu-Shi (JP)

( * ) Notice: Subject to any disclaimer, the term of this patent is extended or adjusted under 35 U.S.C. 154(b) by 240 days.

(21) Appl. No.: 12/224,367

(22) PCT Filed: Feb. 27, 2007

(86) PCT No.: PCT/JP2007/053643
§ 371 (c)(1), (2), (4) Date: Aug. 26, 2008

(87) PCT Pub. No.: WO2007/099956
PCT Pub. Date: Sep. 7, 2007

(65) Prior Publication Data
US 2009/0140151 A1 Jun. 4, 2009

(30) Foreign Application Priority Data
Feb. 28, 2006 (JP) ................................ 2006-053805

(51) Int. Cl.
*G01T 1/20* (2006.01)
*H01J 43/18* (2006.01)

(52) U.S. Cl. .................... 250/361 R; 250/366; 313/532; 313/534

(58) Field of Classification Search .............. 250/361 R, 250/366; 313/532, 534
See application file for complete search history.

(56) References Cited

U.S. PATENT DOCUMENTS

| | | | | |
|---|---|---|---|---|
| 586,465 | A | 7/1897 | Turati | |
| 4,795,390 | A | 1/1989 | Gilbert | |
| 4,871,943 | A | 10/1989 | Eschard | |
| 5,504,386 | A | 4/1996 | Kyushima et al. | |
| 5,841,231 | A * | 11/1998 | Kimura et al. | 313/532 |
| 5,864,207 | A | 1/1999 | Kume et al. | |
| 5,886,465 | A | 3/1999 | Muramatsu et al. | |

(Continued)

FOREIGN PATENT DOCUMENTS

CN 1009311 B 8/1990

(Continued)

OTHER PUBLICATIONS

Apr. 7, 2010 Office Action issued in U.S. Appl. No. 12/224,378.

(Continued)

*Primary Examiner* — David P Porta
*Assistant Examiner* — Shun Lee
(74) *Attorney, Agent, or Firm* — Oliff & Berridge, PLC

(57) ABSTRACT

A vacuum vessel is configured by hermetically joining a faceplate to one end of a side tube and a stem to the other end via a tubular member. A photocathode, a focusing electrode, dynodes, a drawing electrode, and anodes are arranged within the vacuum vessel. The dynodes and the anodes have a plurality of channels in association with each other. The drawing electrode is placed on electrically-conductive supporting pins penetrating the stem. The dynodes are stacked with insulating members interposed between one another. Since the supporting pins and the insulating members are arranged coaxially, each electrode can be fixed by applying pressure in z-axis direction. At the same time, emission of light between the anodes and the drawing electrode can be suppressed, thereby enabling noise to be reduced.

18 Claims, 23 Drawing Sheets

U.S. PATENT DOCUMENTS

| | | | | |
|---|---|---|---|---|
| 5,917,281 | A | 6/1999 | Shimoi et al. | |
| 5,936,348 | A | 8/1999 | Shimoi et al. | |
| 5,990,483 | A | 11/1999 | Shariv et al. | |
| 6,472,664 | B1 * | 10/2002 | Kyushima et al. | 250/366 |
| 6,538,399 | B1 | 3/2003 | Shimoi et al. | |
| 6,650,050 | B1 | 11/2003 | Kyushima et al. | |
| 6,692,691 | B2 | 2/2004 | Sawamura et al. | |
| 6,835,922 | B1 | 12/2004 | Shimoi et al. | |
| 6,927,538 | B2 | 8/2005 | Ishizu et al. | |
| 6,946,792 | B2 | 9/2005 | Kimura et al. | |
| 7,030,406 | B2 | 4/2006 | Edamura et al. | |
| 7,135,670 | B2 | 11/2006 | Shimoi et al. | |
| 7,176,625 | B2 | 2/2007 | Mochizuki et al. | |
| 2003/0102802 | A1 | 6/2003 | Kyushima et al. | |
| 2005/0212421 | A1 | 9/2005 | Kimura et al. | |
| 2006/0028134 | A1 | 2/2006 | Kyushima et al. | |
| 2006/0232205 | A1 | 10/2006 | Hanai et al. | |
| 2009/0009077 | A1 | 1/2009 | Shimoi et al. | |
| 2009/0026353 | A1 | 1/2009 | Shimoi et al. | |
| 2009/0160332 | A1 | 6/2009 | Shimoi et al. | |

FOREIGN PATENT DOCUMENTS

| | | | |
|---|---|---|---|
| CN | 1348601 | A | 5/2002 |
| CN | 1199229 | C | 4/2005 |
| JP | A-59-221957 | | 12/1984 |
| JP | A-60-215585 | | 10/1985 |
| JP | A-61-2253 | | 1/1986 |
| JP | A-62-287560 | | 12/1987 |
| JP | A-5-290793 | | 11/1993 |
| JP | A-8-7825 | | 1/1996 |
| JP | A-9-288992 | | 11/1997 |
| JP | A-9-306416 | | 11/1997 |
| JP | A-10-12185 | | 1/1998 |
| JP | A-10-106481 | | 4/1998 |
| JP | A-10-106482 | | 4/1998 |
| JP | A-2000-67801 | | 3/2000 |
| JP | A-2000-149860 | | 5/2000 |
| JP | A-2000-149862 | | 5/2000 |
| JP | A-2000-306544 | | 11/2000 |
| JP | A-2001-196023 | | 7/2001 |
| JP | A-2001-357803 | | 12/2001 |
| JP | A-2005-11592 | | 1/2005 |
| JP | A-2006-127990 | | 5/2006 |
| WO | WO 02/067288 | A1 | 8/2002 |
| WO | WO 03/098658 | A1 | 11/2003 |
| WO | WO 2004/112081 | A1 | 12/2004 |

OTHER PUBLICATIONS

Apr. 29, 2010 Office Action issued in U.S. Appl. No. 12/224,379.

Oct. 5, 2009 Office Action issued in U.S. Appl. No. 12/224,378.

Notice of Allowance received in U.S. Appl. No. 12/224,377 dated May 18, 2010.

Office Action issued in U.S. Appl. No. 12/224,378; mailed Jun. 11, 2010.

* cited by examiner

PHOTOMULTIPLIER TUBE AND RADIATION DETECTING DEVICE

TECHNICAL FIELD

The present invention relates to a photomultiplier tube and a radiation detecting device.

BACKGROUND ART

A conventional photomultiplier tube includes a photocathode provided on an end of a vacuum vessel for emitting electrons, an electron multiplying section for multiplying the emitted electrons, and an electron detecting section for detecting the multiplied electrons. A electrode-layered unit including dynodes provided with a plurality of channel regions constitutes the electron multiplying section, and a plurality of anodes arranged in association with each channel region constitutes the electron detecting section (for example, refer to patent documents 1 and 2). In such a photomultiplier tube, a connecting section protrudes from each dynode constituting the electrode-layered unit, and each connecting section is individually connected to stem pins. The electrode-layered unit is supported above the electron detecting section by the stem pins in an electrically insulated state from the electron detecting section.

Further, another known photomultiplier tube is configured in such a manner that a shaft is provided for allowing the electron multiplying section to slidably move in parallel with an axis of the photomultiplier tube during manufacture of the photomultiplier tube, and that the electron multiplying section is fixed to the shaft when the manufacture is completed (for example, refer to patent document 3).

Also, there has been provided still another photomultiplier tube in which the electrode-layered unit is supported by, in addition to stem pins connected individually to each dynode, placing the electrode-layered unit on an insulating spacer that is disposed on the periphery of the electron detecting section.

Patent document 1: Japanese Patent Application Publication No. 2000-149860 (page 3, FIG. 2)

Patent document 2: Japanese Patent Application Publication No. HEI9-288992 (page 4, FIG. 2)

Patent document 3: Japanese Patent Application Publication No. SHO62-287560 (pages 4-5, FIG. 1)

DISCLOSURE OF THE INVENTION

Technical Problem

With the photomultiplier tubes described above, it is desired that anti-vibration performance be increased sufficiently to improve reliability, by enhancing fixation strength of an electrode-layered unit disposed above an electron detecting section formed by arranging a plurality of anodes.

In view of the foregoing, it is an object of the present invention to provide a photomultiplier tube and a radiation detecting device that realize high anti-vibration performance, and that preserve predetermined detection characteristics by increasing positioning accuracy between a photocathode and an electron multiplying section.

Technical Solution

In order to attain the above objects, the present invention provides a photomultiplier tube including: a vacuum vessel having a faceplate constituting one end and a stem constituting another end; a photocathode that converts incident light incident through the faceplate to electrons; an electron multiplying section that multiplies the electrons emitted from the photocathode; and an electron detecting section that transmits output signals in response to electrons from the electron multiplying section. The photocathode, the electron multiplying section, and the electron detecting section are provided within the vacuum vessel. The photomultiplier tube is characterized in that the electron multiplying section includes an electrode-layered unit in which electrodes including dynodes constituting a plurality of channels are stacked in a plurality of stages; the electron detecting section includes a plurality of anodes that is arranged spaced away from and in confrontation with a last stage electrode of the electrode-layered unit and that is arranged in association with the channels; and the stem is provided with supporting means for placing the last stage electrode thereon With this configuration, the electron multiplying section is stably supported by the supporting means, and thus good anti-vibration performance is obtained. Also, because the position of the electron multiplying section can be defined with good precision, the distance from the photocathode to the electron multiplying section can be set accurately. Further, because no insulator exists between the anodes and the dynodes, it is possible to prevent an occurrence of leak current due to charging of an insulator, as well as emission of light that occurs when multiplied electrons collide on the insulator At this time, preferably the plurality of stages of electrodes is stacked with an insulator interposed between two adjacent electrodes, and that the insulator and the supporting means are arranged coaxially.

Since the supporting means and the insulators are arranged coaxially in this way, sufficient pressure can be applied in a stacking direction to fix the electron multiplying section, thereby further improving the anti-vibration performance.

In any one of the above-described photomultiplier tubes, the last stage electrode of the electrode-layered unit may include a drawing electrode having an opening that allows the electrons emitted from the dynodes to reach the anodes.

With this configuration, the drawing electrode is provided between the last stage dynode and the electron detecting section, and is applied with an electric potential higher than the last stage dynode and lower than the electron detecting section. Hence, the electric field intensity between the last stage dynode and the electron detecting section uniformly increases. Accordingly, even when there are variations in the setting accuracy among each anode constituting the electron detecting section, electrons can be uniformly drawn from the last stage dynode.

It is preferable that the electron detecting section include either a plurality of multiple anodes arranged two-dimensionally or a plurality of linear anodes arranged one-dimensionally.

With this configuration, electrons can be detected by the plurality of anodes, and the incident position of the incident light that enters the photomultiplier tube can be measured.

Further, it is preferable that the supporting means be formed of an electrically-conductive material.

With this configuration, no light is emitted even when electrons collide on the supporting means, thereby preventing noise.

Further, it is preferable that the supporting means include a supporting section that extends from the stem in a stacking direction of the electrode-layered unit and a placing section on which the last stage electrode is placed, and that a cross-sectional area of the placing section in a plane perpendicular to the stacking direction be larger than a cross-sectional area of the supporting section in a plane perpendicular to the stacking direction.

With this configuration, the cross-sectional area of the placing section in the plane perpendicular to the stacking direction is larger than the cross-sectional area of the supporting section in the plane perpendicular to the stacking direction. Hence, the positioning accuracy of the electrode-layered unit in the stacking direction can be set reliably. In addition, the electrode-layered unit can be stably placed on the placing surface of the placing section.

Further, it is preferable that a first engaging section be formed on a surface of the placing section on which the last stage electrode is placed, that a second engaging section be formed on a surface of the last stage electrode that is placed on the placing section, and that the first engaging section and the second engaging section be engaged with each other when the last stage electrode is placed on the supporting means.

With this configuration, the positioning accuracy of the electrode-layered unit in the directions along the plane perpendicular to the stacking direction can be improved.

A radiation detecting device having the above-described effects can be obtained by disposing, outside of the faceplate of any one of the above-described photomultiplier tubes, a scintillator that converts radiation to light and that outputs the light

Advantageous Effects

According to the present invention, there is provided a photomultiplier tube and a radiation detecting device that have high anti-vibration performance and that preserve predetermined characteristics by increasing positioning accuracy between a photocathode and an electron multiplying section.

DESCRIPTION OF REFERENCE NUMERALS

Figure 1:
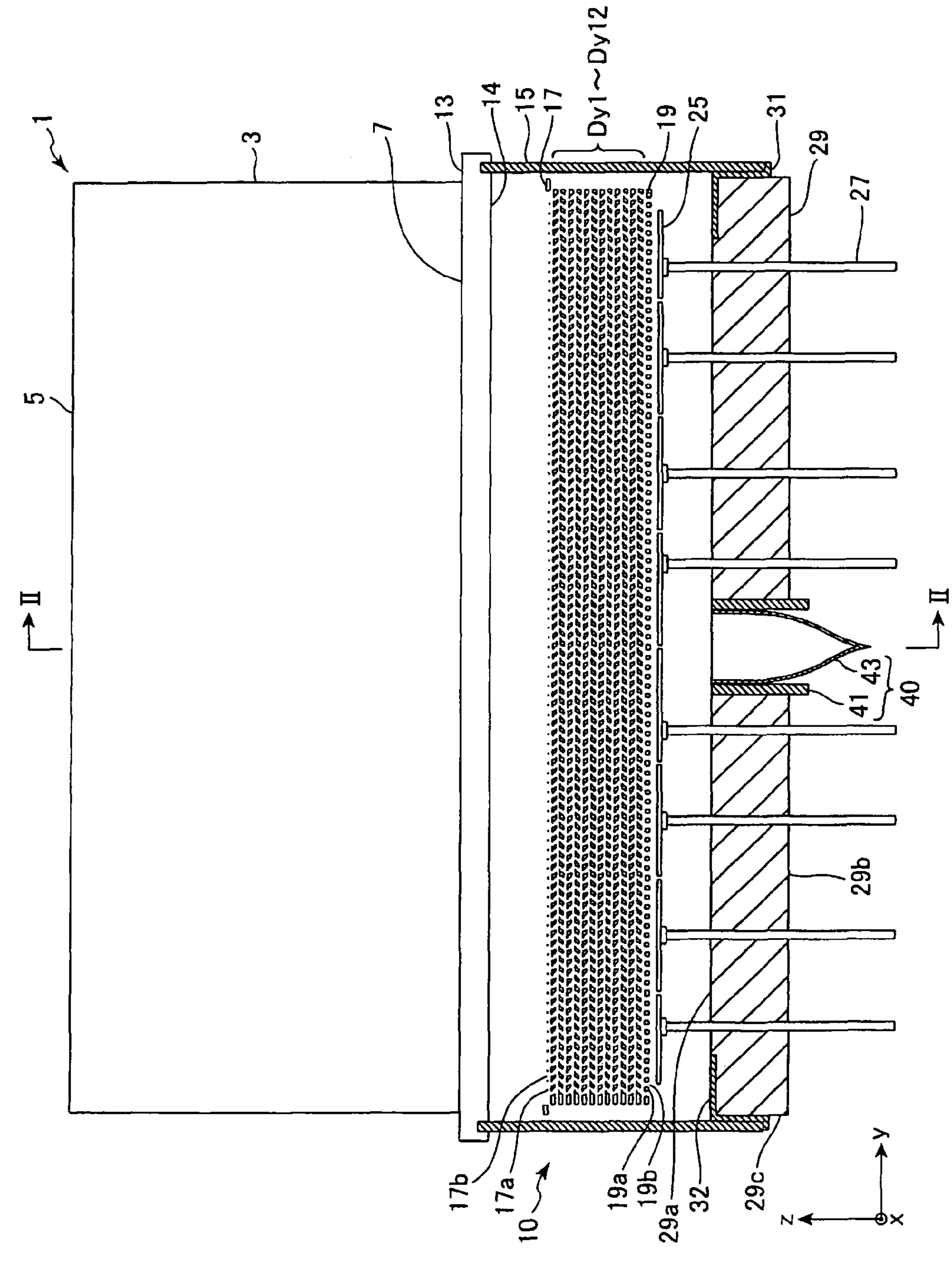
FIG. 1 is a schematic cross-sectional view of a radiation detecting device 1 according to an embodiment of the present invention.

1: radiation detecting device
3: scintillator
5: incident surface
7: output surface
10: photomultiplier tube
13: faceplate
14: photocathode
15: side tube
17: focusing electrode
19: drawing electrode
21: supporting pin
23: insulating member
25: anode
27: stem pin
29: stem
31: tubular member
32:. extending section
33: protuberant section
35: shaft
47: lead pin

BEST MODE FOR CARRYING OUT THE INVENTION

Hereinafter, an embodiment of the present invention will be described while referring to the accompanying drawings.

FIGS. 1 through 22 show a radiation detecting device including a photomultiplier tube according to the embodiment of the present invention. In each drawing, the substantially same parts are designated by the same reference numerals to avoid duplicating description. Note that, in the following description, the terms "upper", "lower", and the like are used based on a state shown in each drawing, for descriptive purposes.

Figure 2:
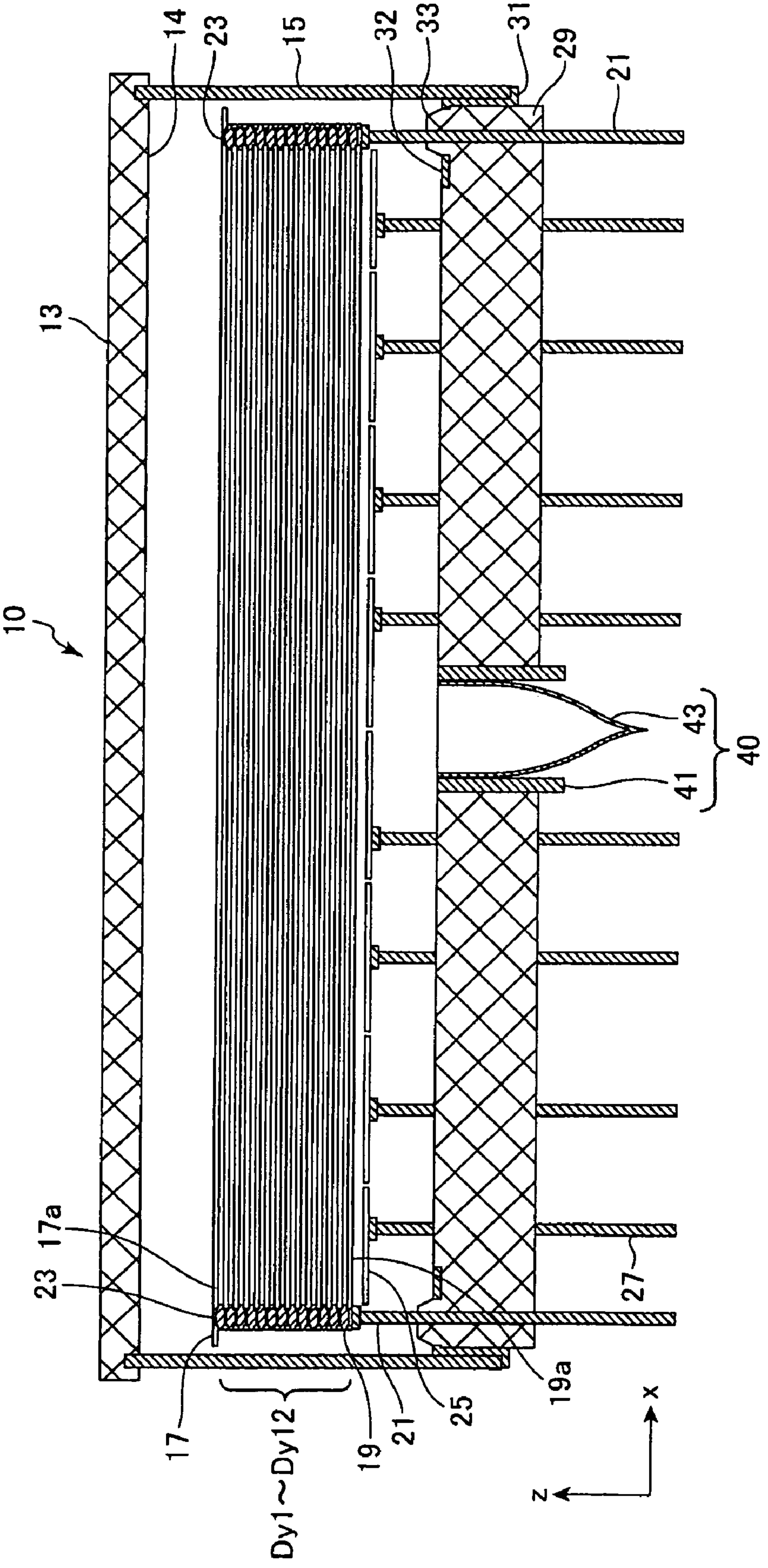
FIG. 2 is a schematic cross-sectional view of a photomultiplier tube 10 taken along a line II-II of FIG. 1.

FIG. 1 is a schematic cross-sectional view of a radiation detecting device 1 according to the present embodiment FIG. 2 is a schematic cross-sectional-view of a photomultiplier tube 10 taken along a line II-II of FIG. 1. As shown in FIGS.

1 and 2, the radiation detecting device 1 includes a scintillator 3 that converts incident radiation to light and outputs the light, and the photomultiplier tube 10 that converts incident light to electrons, multiplies the electrons, and detects the electrons. The radiation detecting device 1 is a device that detects incident radiation and outputs signals. The photomultiplier tube 10 has a cylindrical shape with a substantially rectangular cross-section. The direction of the tube axis is defined as z-axis, the axis perpendicular to the drawing of FIG. 1 is defined as x-axis, and the axis perpendicular to both z-axis and x-axis is defined as y-axis.

The scintillator 3 includes an incident surface 5 at one end in the z-axis direction and an output surface 7 at the other end, and has a substantially rectangular cross-section. Radiation is incident at the incident surface 5 side of the scintillator 3, and the incident radiation is converted to light inside the scintillator 3, and the light travels within the scintillator 3 and is outputted from the output surface 7 side. The photomultiplier tube 10 is in contact with the output surface 7 side of the scintillator 3. The central axis of the scintillator 3 and the tube axis of the photomultiplier tube 10 are approximately coaxial.

The photomultiplier tube 10 is a vacuum vessel manufactured by hermetically connecting and fixing a faceplate 13 that constitutes one end section in the z-axis direction, a stem 29 that constitutes the other end section, a tubular member 31 provided at the periphery of the stem 29, an air discharging tube 40 provided at an approximate center of the stem 29 in the xy plane, and a side tube 15 having a cylindrical shape. Within the vacuum vessel of the photomultiplier tube 10 arranged are a focusing electrode 17, an electrode-layered unit including a plurality of dynodes Dy1-Dy12, an electron detecting section including a plurality of anodes 25 that detects electrons and outputs signals, and a drawing electrode 19 provided between the electrode-layered unit and the electron detecting section.

The faceplate 13 is formed of glass, for example, and has a substantially rectangular plate shape. A photocathode 14 for converting incident light to electrons is provided at the inner side of the faceplate 13, that is, at the lower side in the z-axis direction. The photocathode 14 is formed by reaction of preliminary vapor-deposited antimony and alkali metal vapor, for example. The photocathode 14 is provided on an approximately entire surface of the inner side of the faceplate 13. The photocathode 14 converts the light having been outputted from the scintillator 3 and incident through the faceplate 13 to electrons, and emits the electrons. The side tube 15 is formed of metal, for example, and has a cylindrical shape with a substantially rectangular cross-section. The side tube 15 constitutes side surfaces of the photomultiplier tube 10. The faceplate 13 is hermetically fixed to one side of the side tube 15, while the stem 29 is hermetically fixed to the other side of the side tube 15 via the tubular member 31. Here, the photocathode 14 is electrically connected to the side tube 15, and has the same electric potential as the side tube 15.

Figure 3:
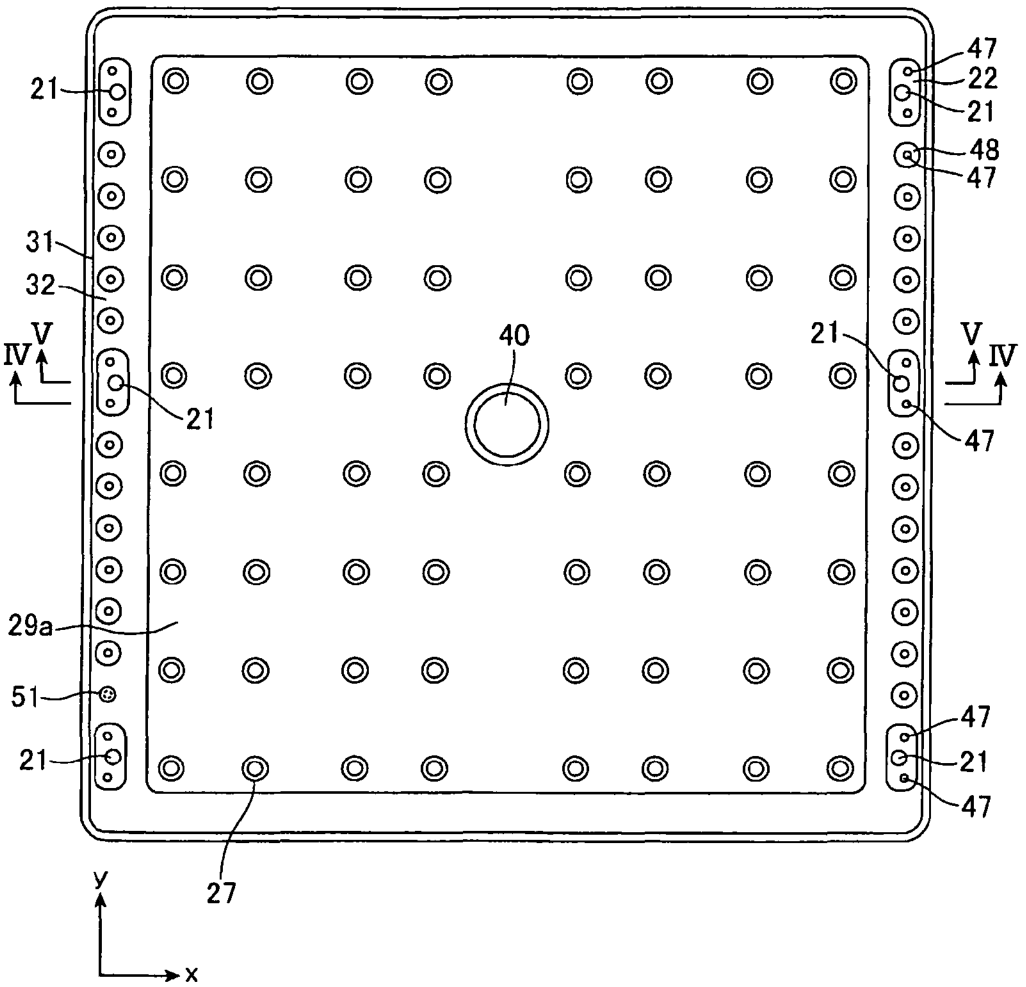
FIG. 3 is a plan view showing an inner surface 29*a*, a tubular member 31, and an extending section 32 of a stem 29.

FIG. 3 is a plan view showing an inner surface 29*a* of the stem 29, the tubular member 31, and an extending section 32. As shown in FIGS. 1 through 3, the stem 29 is formed of a Kovar glass, for example, and has a substantially rectangular plate shape. The stem 29 has the inner surface 29*a* at the inner side of the photomultiplier tube 10, an outer surface 29*b*, and a peripheral section 29*c* that connects those surfaces. Electrically-conductive stem pins 27 for supporting the anodes 25 are hermetically inserted in the stem 29, the number of the stem pins 27 corresponding to the number of channels of the anodes 25 (64 in this example)

The tubular member 31 surrounding the peripheral section 29*c* is hermetically joined to the peripheral section 29*c* of the stem 29. The tubular member 31 is formed of metal, for example, and has a tubular shape with a substantially rectangular cross-section. The tubular member 31 is also hermetically joined to the side tube 15. The extending section 32 extends from the tubular member 31 to the inner side of the photomultiplier tube 10 along the inner surface 29*a* of the stem 29. The extending section 32 is formed of metal, for example, and has a substantially rectangular tubular shape in a plan view.

A plurality of through-hole sections 22 and 48 is formed at both ends of the extending section 32 in the x-axis direction. Supporting pins 21 and/or lead pins 47 penetrate and are fixed to the plurality of through-hole sections 22 and 48 respectively. In addition, a focus pin 51 is erected in the extending section 32 at the left end thereof in the x-axis direction in FIG. 3.

The supporting pin 21 is formed of an electrically-conductive material. In the present embodiment, three supporting pins 21 are provided at each end in the x-axis direction (i.e., six supporting pins 21 in total). Note that FIG. 2 shows a cross-section taken along a line V-V of FIG. 3. As shown in FIG. 2, the supporting pins 21 penetrate the stem 29 and extend upward in the z-axis direction for placing the drawing electrode 19 thereon. The supporting pins 21 have the same electrical potential as the drawing electrode 19.

Figure 5:
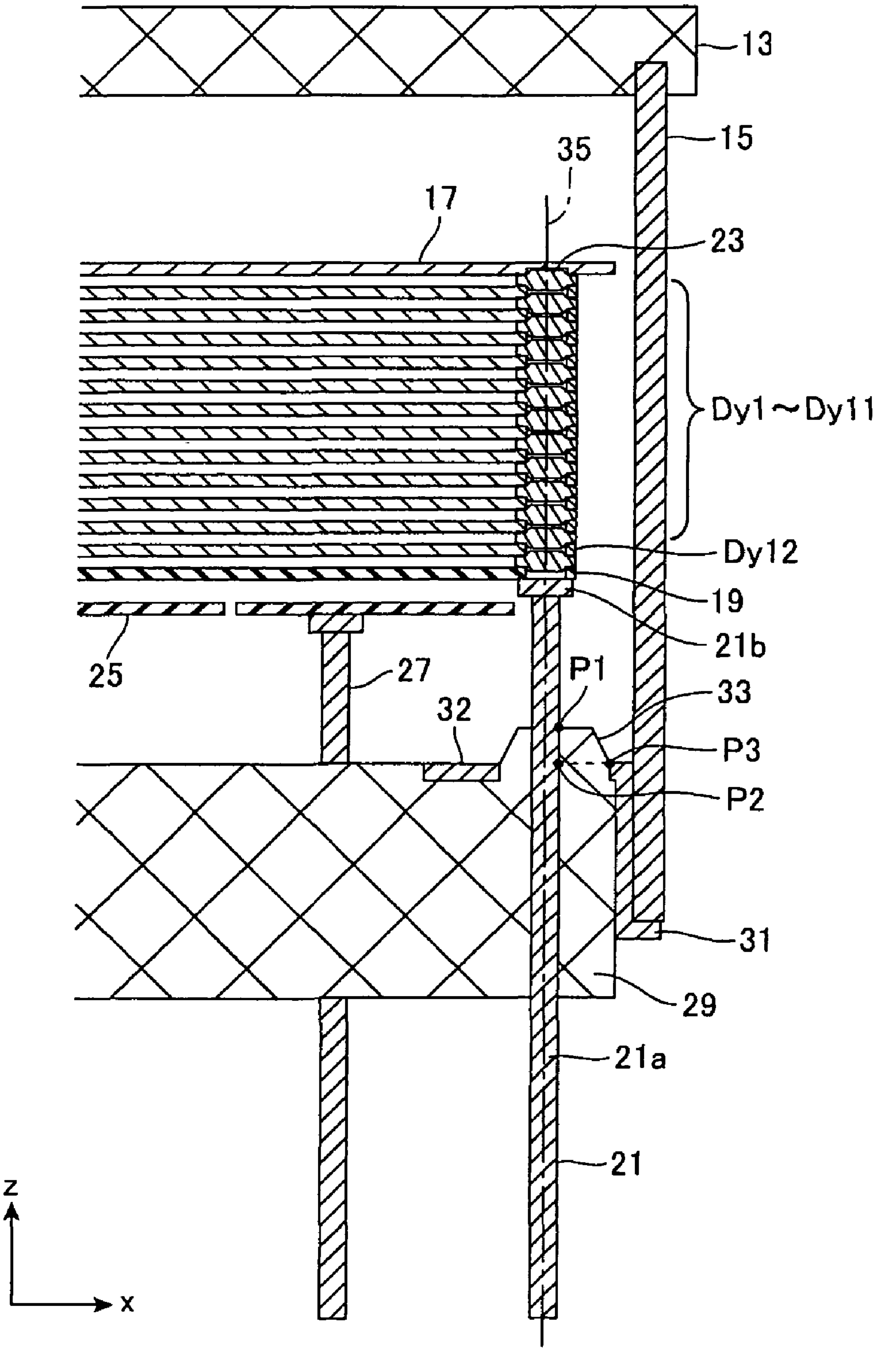
FIG. 5 is a partial enlarged view of FIG. 2.

As shown in FIG. 5, the supporting pin 21 includes a supporting section 21*a* that penetrates the stem 29 and extends in the z-axis direction, and a placing section 21*b* provided to the upper end of the supporting section 21*a* in the z-axis direction for placing the electrode-layered unit thereon. Here, the placing section 21*b* is formed in such a manner that the cross-sectional area thereof in the xy plane is larger than that of the supporting section 21*a*. The electrode-layered unit is supported on the supporting pins 21 in such a manner that the lower surface of the lowermost electrode (the drawing electrode 19 in the present embodiment) abuts on the upper surface (placing surface) of the placing section 21*b*. Because the placing section 21*b* has a larger cross-sectional area in the xy plane than the supporting section 21*a*; the positioning accuracy of the electrode-layered unit in the z-axis direction is set reliably, and the electrode-layered unit can be placed stably on the placing surface of the placing section 21*b*.

Figure 4:
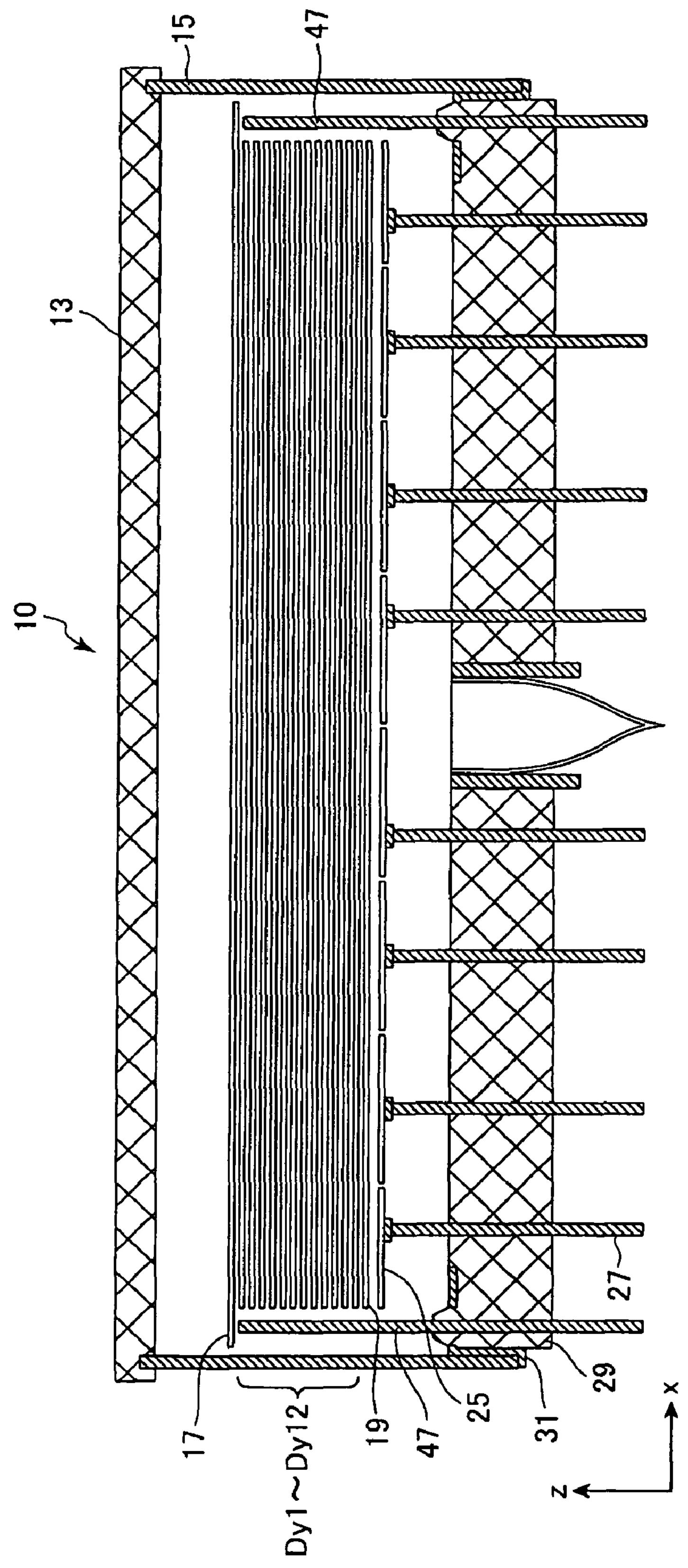
FIG. 4 is a cross-sectional view taken along a line IV-IV of FIG. 3.

The lead pins 47 are formed of electrically-conductive material. In the present embodiment, a total of 35 lead pins 47 are provided at both ends in the x-axis direction. FIG. 4 shows a cross-section taken along a line IV-IV of FIG. 3. As shown in FIG. 4, the lead pins 47 penetrate the stem 29 and extend upward in the z-axis direction. The lead pins 47 are connected to respective ones of the dynodes Dy1-Dy12 and to the drawing electrode 19, and supply predetermined electrical potentials thereto. Note that each of the lead pins 47 is formed in a length in accordance with the positions of the respective dynodes Dy1-Dy12 to which the lead pins 47 are connected. The focus pin 51 is formed of electrically-conductive material. The focus pin 51 extends upward in the z-axis direction from the stem 29 and is connected to the focusing electrode 17. The focusing electrode 17 is electrically connected to the side tube 15 via the focus pin 51 that is welded to the tubular member 31. The focusing electrode 17 has the same electrical potential as the photocathode 14.

Figure 6:
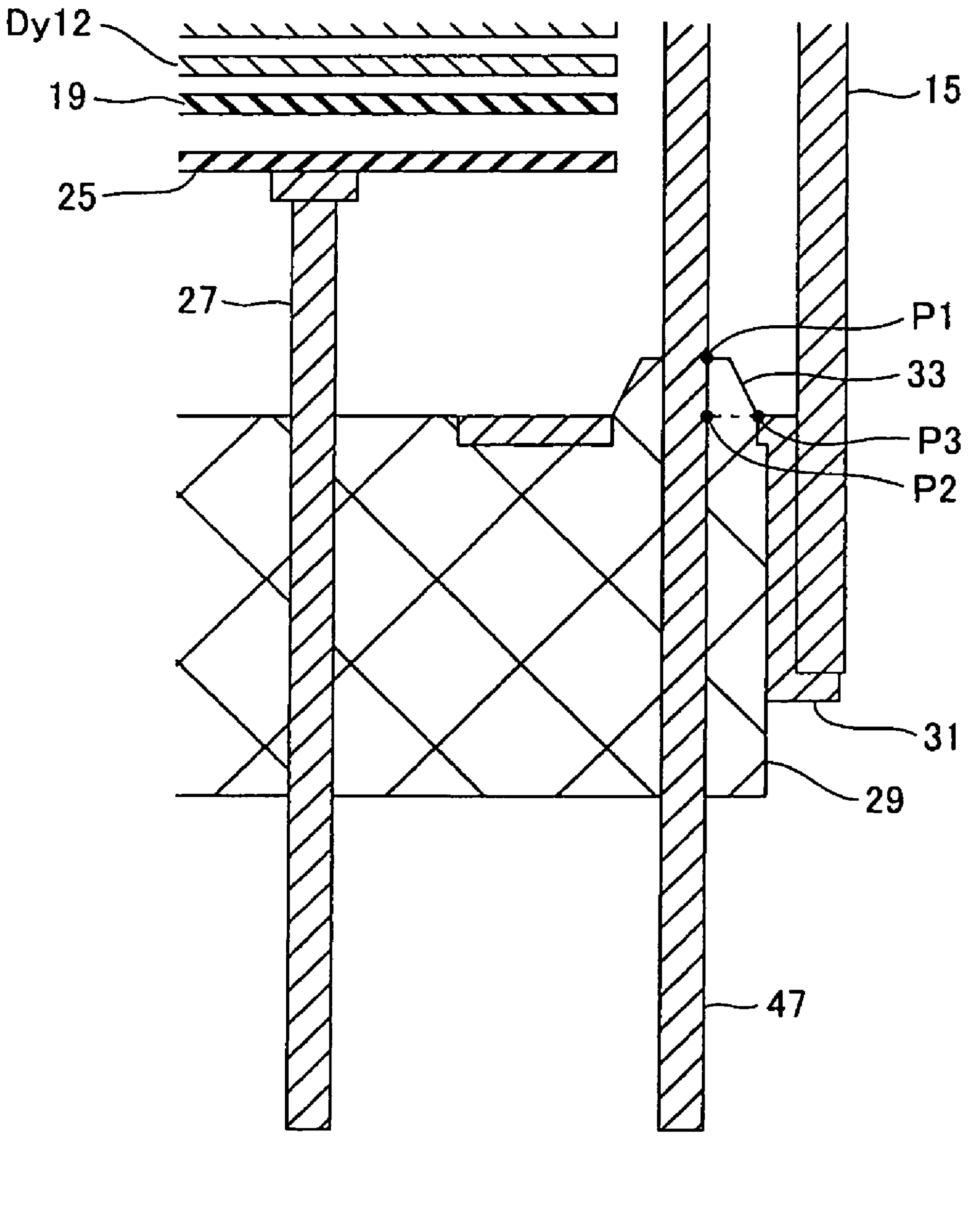
FIG. 6 is a partial enlarged view of FIG. 4.

FIG. 5 is a partial enlarged view of FIG. 2, that is, a cross-section taken along a line V-V of FIG. 3. FIG. 6 is a partial enlarged view of FIG. 4, that is, a cross-section taken along a line IV-IV of FIG. 3. As shown in FIGS. 5 and 6, a protuberant section 33 raised from the stem 29 is formed at positions where the supporting pins 21 and the lead pins 47 in the through-hole sections 22 and 48 are connected to the inner surface 29*a* of the stem 29. Here, a contact point between the protuberant section 33 and the supporting pin 21 or the lead pin 47 is referred to as a point P1. A virtual contact point between the inner surface 29*a* and the supporting pin 21 or the lead pin 47 is referred to as a point P2, when it is assumed that the protuberant section 33 does not exist. A contact point between the protuberant section 33 and the extending section 32 is referred to as a point P3. The distance between the point P1 and the point P3 is longer than the distance between the point P3 and the point P2. Accordingly, in the present embodiment, the existence of the protuberant sections 33 ensures that the creepage distance between the supporting pin 21 or the lead pin 47 and the tubular member 31 is made long.

As shown in FIGS. 1 and 2, the focusing electrode 17 is arranged in confrontation with the photocathode 14 with a predetermined distance kept therebetween. The focusing electrode 17 is a thin electrode with a substantially rectangular shape, and includes a plurality of focus pieces 17*a* extending in the x-axis direction and a plurality of slit-shaped openings 17*b* formed by the plurality of focus pieces 17*a*. The focusing electrode 17 serves to efficiently converge the electrons to electron multiplying openings 18*a* (see FIG. 7) of the dynode Dy1. The focusing electrode 17 is electrically connected to the side tube 15 via the focus pin 51 (see FIG. 3) erected in the extending section 32, and thus has the same electrical potential with the photocathode 14.

Figure 7:
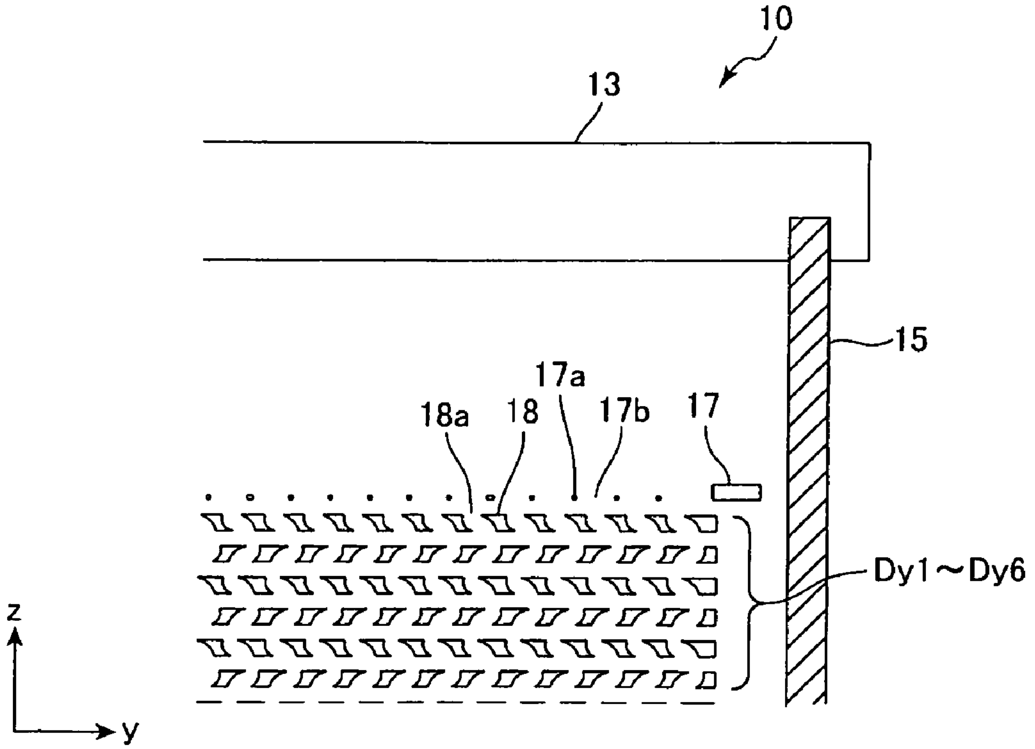
FIG. 7 is a partial enlarged view of FIG. 1.

The dynodes Dy1-Dy12 are electrodes for multiplying electrons. The dynodes Dy1-Dy12 are stacked below the focusing electrode 17 in the z-axis direction such that the dynodes are in confrontation with and in substantially parallel with each other. FIG. 7 is a partial enlarged view of FIG. 1. As shown in FIG. 7, the dynodes Dy1-Dy12 are thin-plate type electrodes having substantially rectangular shapes, in which electron multiplying pieces 18 are arranged in parallel with and spaced away from each other. The electron multiplying piece 18 has a cross-section with concavities and convexities in the yz plane. Thus, in the dynodes Dy1-Dy12, the slit-shaped electron multiplying openings 18*a* extending in the x-axis direction are formed between the adjacent electron multiplying pieces 18. A predetermined number of the electron multiplying openings 18*a* correspond to each anode. Partition walls 71 (see FIG. 15) extending in the y-axis direction are provided at positions corresponding to border sections in the x-axis direction of each channel of the anodes 25. The partition walls 71 define borders in the y-axis direction of a plurality of channels of the dynodes Dy1-Dy12. Further, as shown in FIGS. 2 and 5, an insulating member 23 is arranged between adjacent two of the dynodes Dy1-Dy12. The dynodes Dy1-Dy12 are applied with electric potentials by the lead pins 47, where the electric potentials increase sequentially from the photocathode 14 side toward the stem 29 side.

The drawing electrode 19 is arranged at the stem 29 side of the dynode Dy12 so that the drawing electrode 19 is spaced away from the dynode Dy12 via the insulating member 23 and is in confrontation with and in substantially parallel with the dynode Dy12. The drawing electrode 19 is a thin-plate type electrode formed of the same material as the dynodes Dy1-Dy12. The drawing electrode 19 includes a plurality of drawing pieces 19*a* extending in the x-axis direction and a plurality of slit-shaped openings 19*b* formed by the plurality of drawing pieces 19*a*. The openings 19*b* serve to pass the electrons emitted from the dynode Dy12 toward the anode 25, and hence, are different from the electron multiplying openings 18*a* of the dynodes Dy1-Dy12. Hence, the openings 19*b* are designed so that the electrons emitted from the dynode Dy12 can collide against the openings 19*b* as less as possible. The drawing electrode 19 is applied with a predetermined electric potential that is higher than the dynode Dy12 and lower than the anode 25, thereby producing a uniform electric field intensity on a secondary electron surface of the dynode Dy12. Here, the secondary electron surface indicates a portion formed at the electron multiplying openings 18*a* of each dynode Dy and contributing to multiplication of electrons.

If the drawing electrode 19 does not exist, an electric field for drawing electrons from the dynode Dy12 depends on the potential difference between the dynode Dy12 and the anode 25 and the distance therebetween. Hence, if each anode 25 is arranged in a somewhat slanted manner with respect to the xy plane, the distance between the dynode Dy12 and the anode 25 is different depending on each position. Hence, the electric field intensity with respect to the dynode Dy12 becomes nonuniform, and thus electrons cannot be drawn uniformly. However, in the present embodiment, because the drawing electrode 19 is arranged between the dynode Dy12 and the anode 25, the electric field with respect to the dynode Dy12 is determined by the potential difference between the dynode Dy12 and the drawing electrode 19 and the distance therebetween. Because the potential difference between the dynode Dy12 and the drawing electrode 19 and the distance therebetween are uniform, the electric field intensity on the secondary electron surface of the dynode Dy12 is kept uniform, thereby enabling electrons to be drawn from the dynode Dy12 with a uniform force. Accordingly, even if each of the anodes 25 is arranged in a somewhat slanted manner with respect to the xy plane, electrons can be drawn from the dynode Dy12 uniformly.

As described above, the peripheral section of the drawing electrode 19 is placed on the placing sections 21*b* of the supporting pins 21 made of a conductive material. As shown in FIG. 5, because the supporting pin 21 and the plurality of insulating members 23 are arranged coaxially on a z-axis direction axis 35, it is possible to fix the focusing electrode 17, the dynodes Dy1-Dy12, and the drawing electrode 19 by applying a high pressure downward in the z-axis direction.

The anode 25 is an electron detecting section that detects electrons and that outputs signals in response to the detected electrons to outside of the photomultiplier tube 10 via the stem pin 27. The anode 25 is provided at the stem 29 side of the drawing electrode 19, and arranged in substantially parallel with and in confrontation with the drawing electrode 19. As shown in FIGS. 1 and 2, the anode 25 includes a plurality of thin-plate type electrodes provided in association with the plurality of channels of the dynodes Dy1-Dy12. Each anode 25 is welded to the corresponding stem pin 27, and is applied with a predetermined electric potential that is higher than the electric potential of the drawing electrode 19 via the stem pins 27. Further, the anode 25 is provided with a plurality of slits for diffusing alkali metal vapor that is introduced through the air discharging tube 40 during assembling.

Hereinafter, the configuration of the focusing electrode 17, the dynodes Dy1-Dy12, the drawing electrode 19, and the anodes 25 will be described in greater detail.

Figure 8:
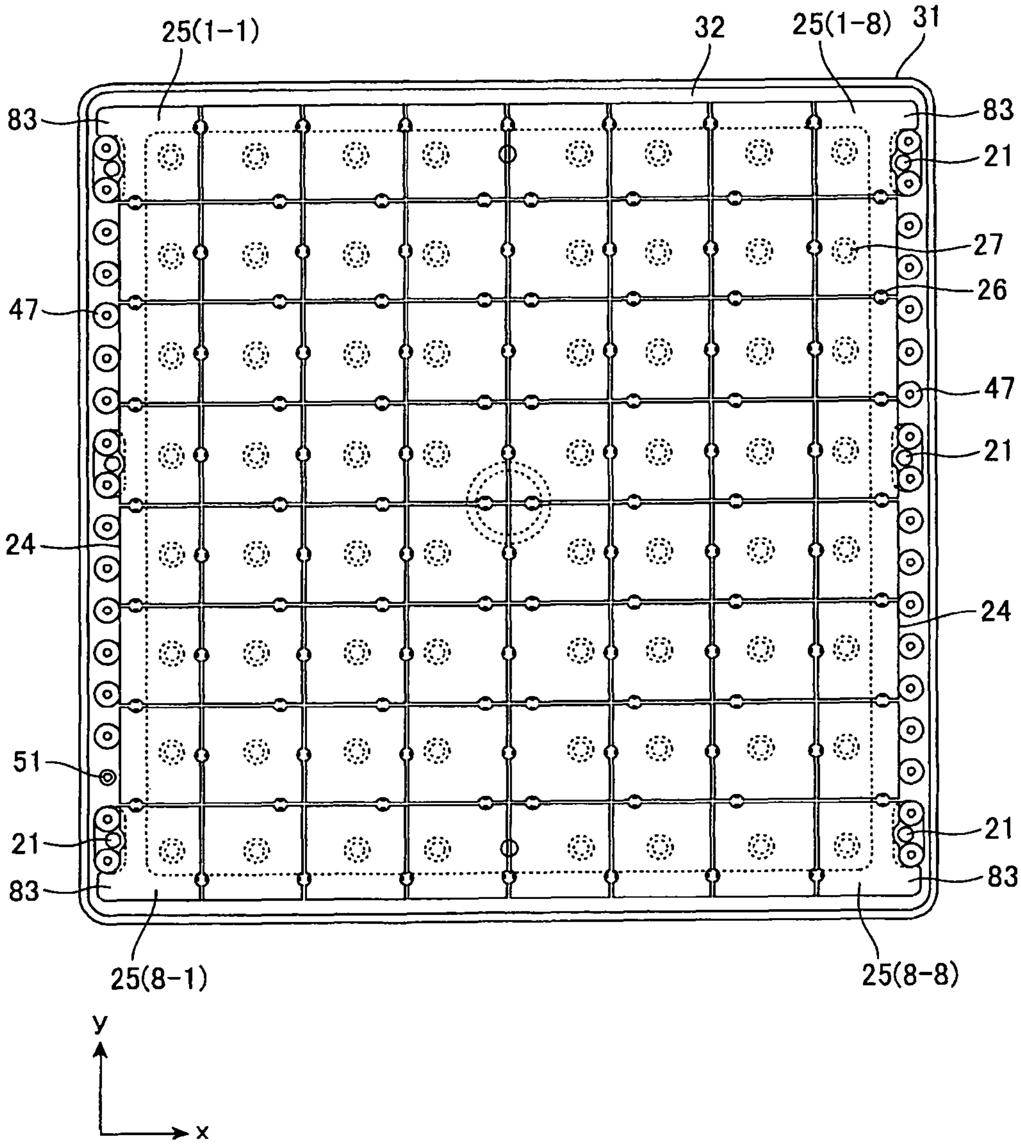
FIG. 8 is a schematic view of an anode 25 and its configuration at the lower side in z-axis, when viewed from the upper side in z-axis.
Figure 9:
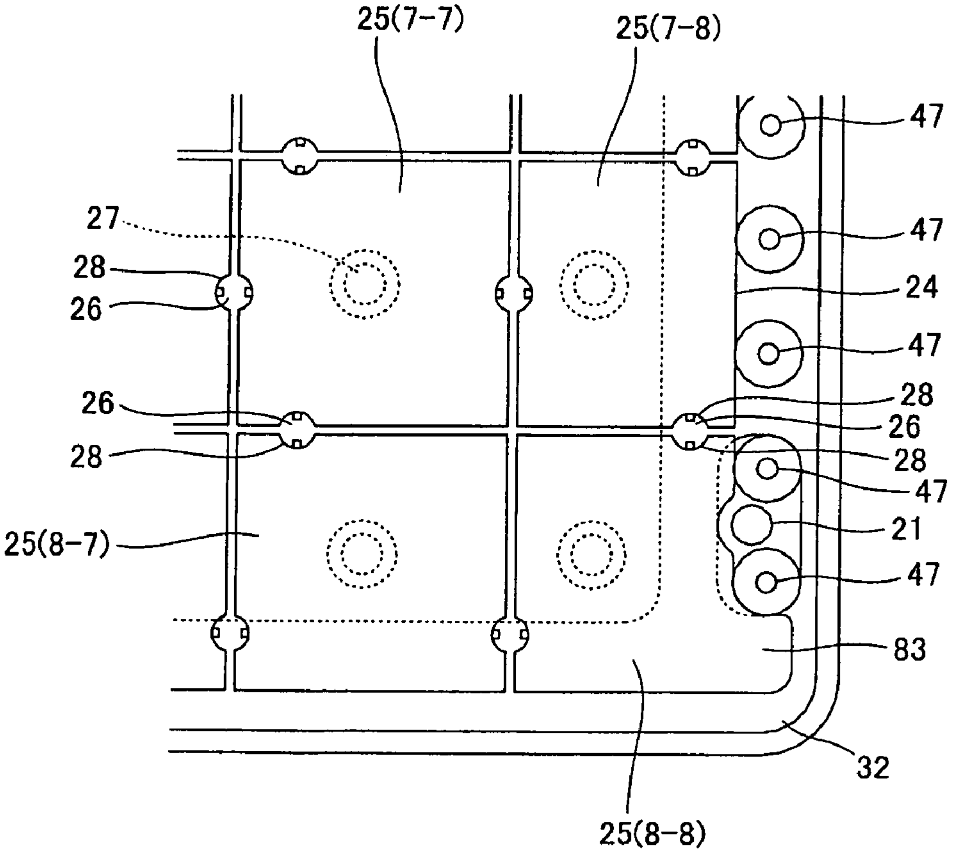
FIG. 9 is a partial enlarged view of FIG. 8.

FIG. 8 is a schematic view of the electron multiplying section, when viewed from the upper side in z-axis, and FIG. 9 is a partial enlarged view of FIG. 8. As shown in FIG. 8, the electron multiplying section is configured by arranging a plurality of anodes 25 (64 anodes in the present embodiment) two-dimensionally. The anodes 25 are individually supported by respective ones of the stem pins 27, and are electrically connected to a circuit (not shown) via the stem pins 27.

Here, unit anodes are referred to as anode 25(1-1), 25(1-2), . . . , 25(8-8), beginning from the left top of FIG. 8, for descriptive purposes. With each anode 25(1-1), 25(1-2), 25(8-8), concave sections 28 are formed between adjacent unit anodes in confrontation with each other. Bridge remaining sections 26 remain in the concave sections 28. At the time of assembling, the anode 25 is formed as an integral anode plate where adjacent unit anodes are connected to each other by bridges, and each unit anode is welded and fixed to each stem pin 27 in an integral state. Thereafter, the bridges are cut off and the anodes 25(1-1), 25(1-2), . . . , 25(8-8) become independent from one another. The bridge remaining sections 26 are the remaining portions after the bridges are cut off.

Further, cutout portions 24 are formed in the anodes 25(1-1), 25(2-1), . . . , 25(8-1) and the anodes 25(1-8), 25(2-8), 25(8-8) that correspond to the both end sections in the x-axis direction, except at corner sections 83 of the anodes 25(1-1), 25(1-8), 25(8-1), and 25(8-8). Hence, the cutout portions 24 serve to avoid contacts between the anodes 25 and each of the supporting pins 21, the lead pins 47 and the focus pin 51, and also to enlarge the effective area of the electron detecting section until the proximity of the side tube 15.

Figure 10:
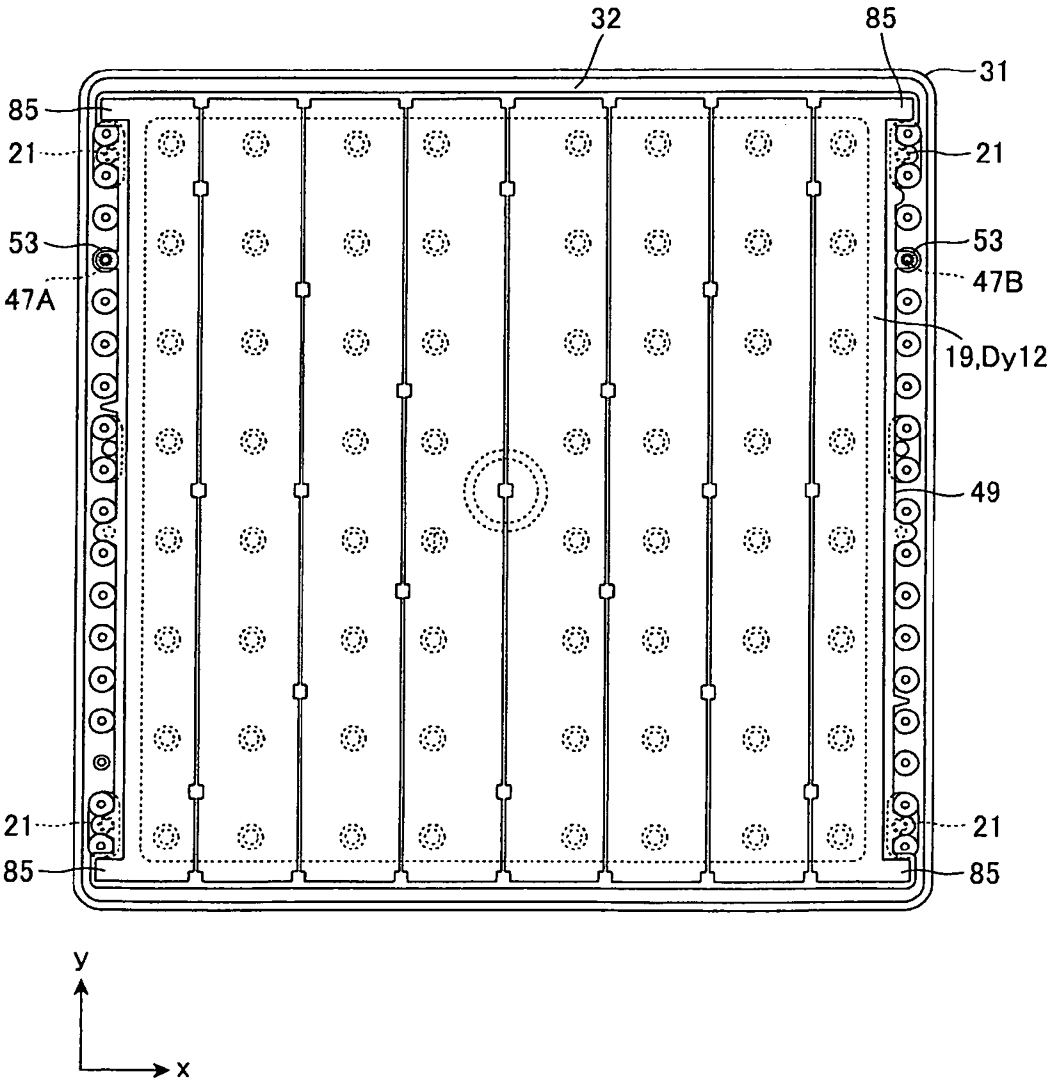
FIG. 10 is a schematic view of a dynode Dy12 and its configuration at the lower side in z-axis, when viewed from the upper side in x-axis.
Figure 11:
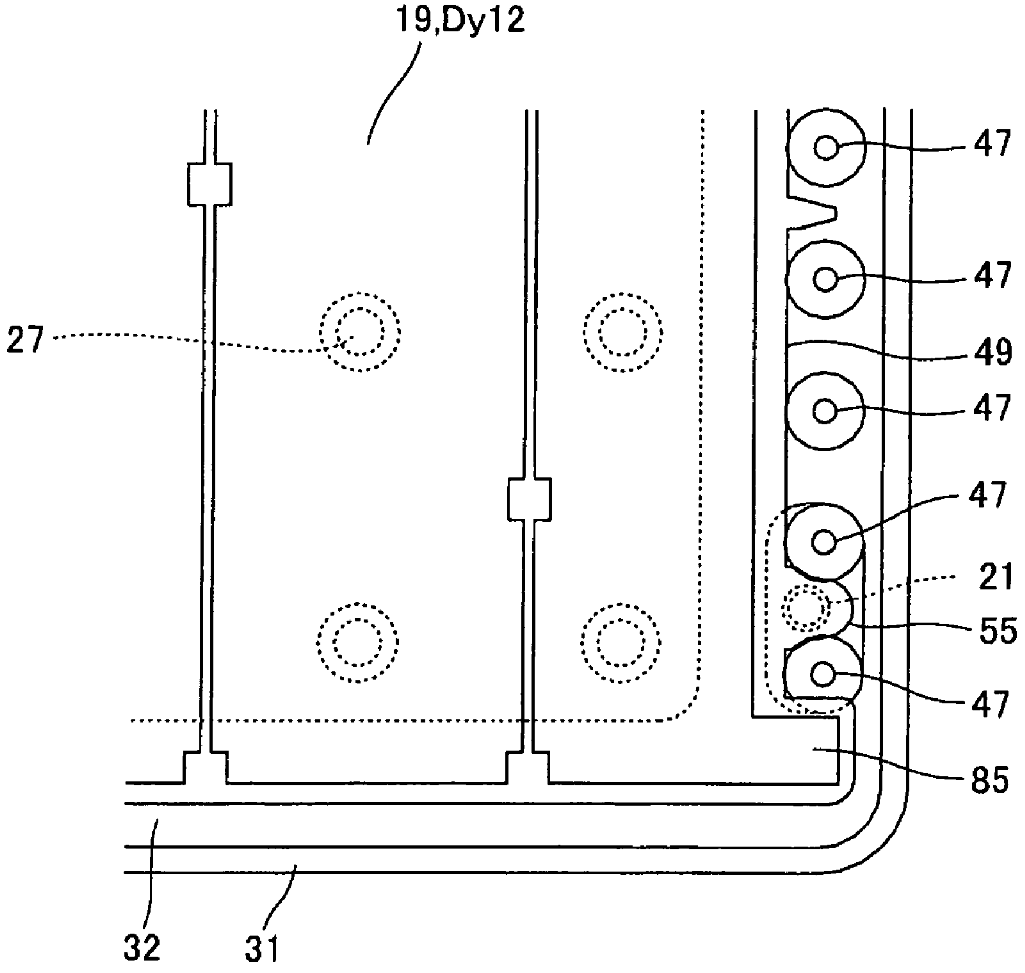
FIG. 11 is a partial enlarged view of FIG. 10.

FIG. 10 is a schematic view of the dynode Dy12, when viewed from the upper side in z-axis, and FIG. 11 is a partial enlarged view of FIG. 10. Note that, in FIGS. 10 and 11, the openings 18*a* and 19*b* of the electron multiplying pieces 18 and the drawing electrode 19 are omitted. As shown in FIG. 11, the dynode Dy12 and the drawing electrode 19 have outer shapes substantially identical to the shape of the anode 25 in the xy plane. That is, the dynode Dy12 and the drawing electrode 19 are formed with cutout portions 49 at the both end sections in the x-axis direction for avoiding the supporting pins 21, the lead pins 47, and the like. The cutout portions 49 of the drawing electrode 19 are formed with protruding portions 55. The supporting pins 21 support the entire drawing electrode 19 by placing the protruding portions 55 on the supporting pins 21. Similarly, the dynode Dy12 also has the protruding portions 53. In case of the dynode Dy12, since the dynode is connected to lead pins 47A and 47B and is applied with a predetermined electric potential, protruding portions 53 are formed around the lead pins 47A and 47B. Further, the electrode is formed to the proximity of the inner wall surface of the side tube 15 at the both end sections in the y-axis direction. Especially, corner sections 85 protrude at the four corner sections. Note that dynodes Dy1-Dy11 have substantially the same configuration as the dynode Dy12. Each lead pin 47 extends in the z-axis direction and is connected to a predetermined dynode Dy.

Figure 12:
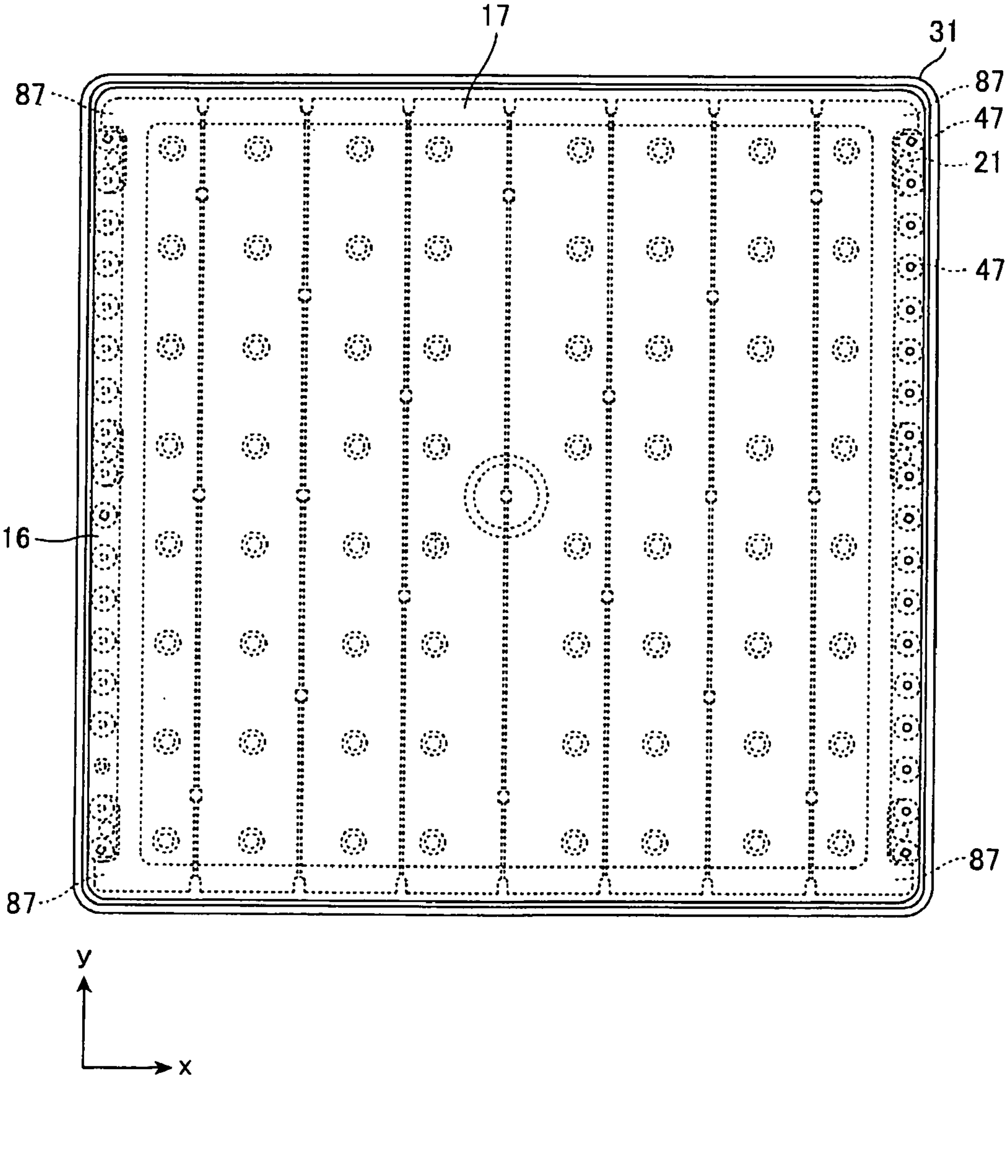
FIG. 12 is a schematic view of a focusing electrode 17 and its configuration at the lower side in z-axis, when viewed from the upper side in z-axis.
Figure 13:
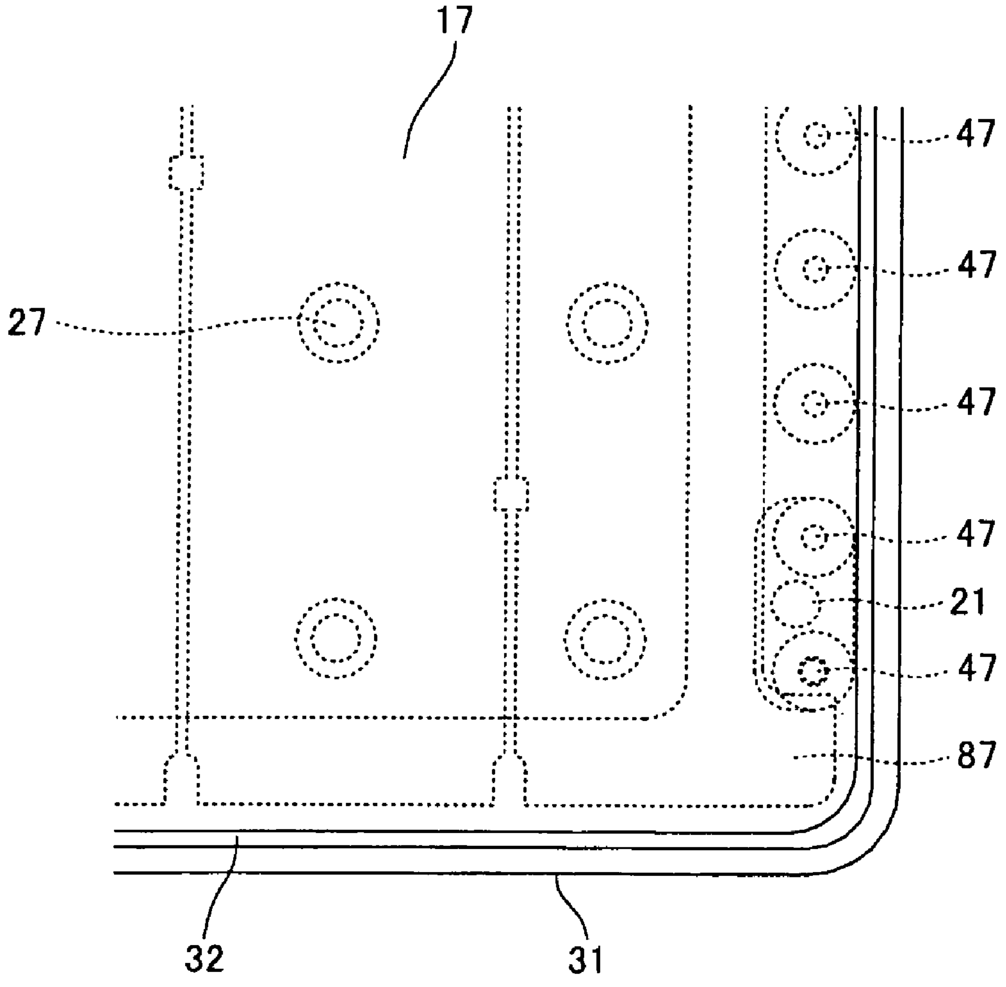
FIGS. 13 is a partial enlarged view of FIG. 12.

FIG. 12 is a schematic view of the focusing electrode 17, when viewed from the upper side in z-axis, and FIG. 13 is a partial enlarged view of FIG. 12. Note that, in FIGS. 12 and 13, the focus pieces 17*a* and the openings 17*b* shown in FIGS. 1 and 2 are omitted. As shown in FIGS. 12 and 13, the focusing electrode 17 is provided to the peripheral sections in the x-axis direction so that the focusing electrode 17 can cover the cutout portions 24 of the anodes 25 and the cutout portions 49 of the dynodes Dy1-Dy12 and the drawing electrode 19. Note that portions of the focusing electrode 17 that cover the cutout portions 24 or the cutout portions 49 constitute flat-plate electrode sections 16 with no slits formed thereon. The four corner sections of the focusing electrode 17 constitute corner sections 87 having slits.

Figure 14:
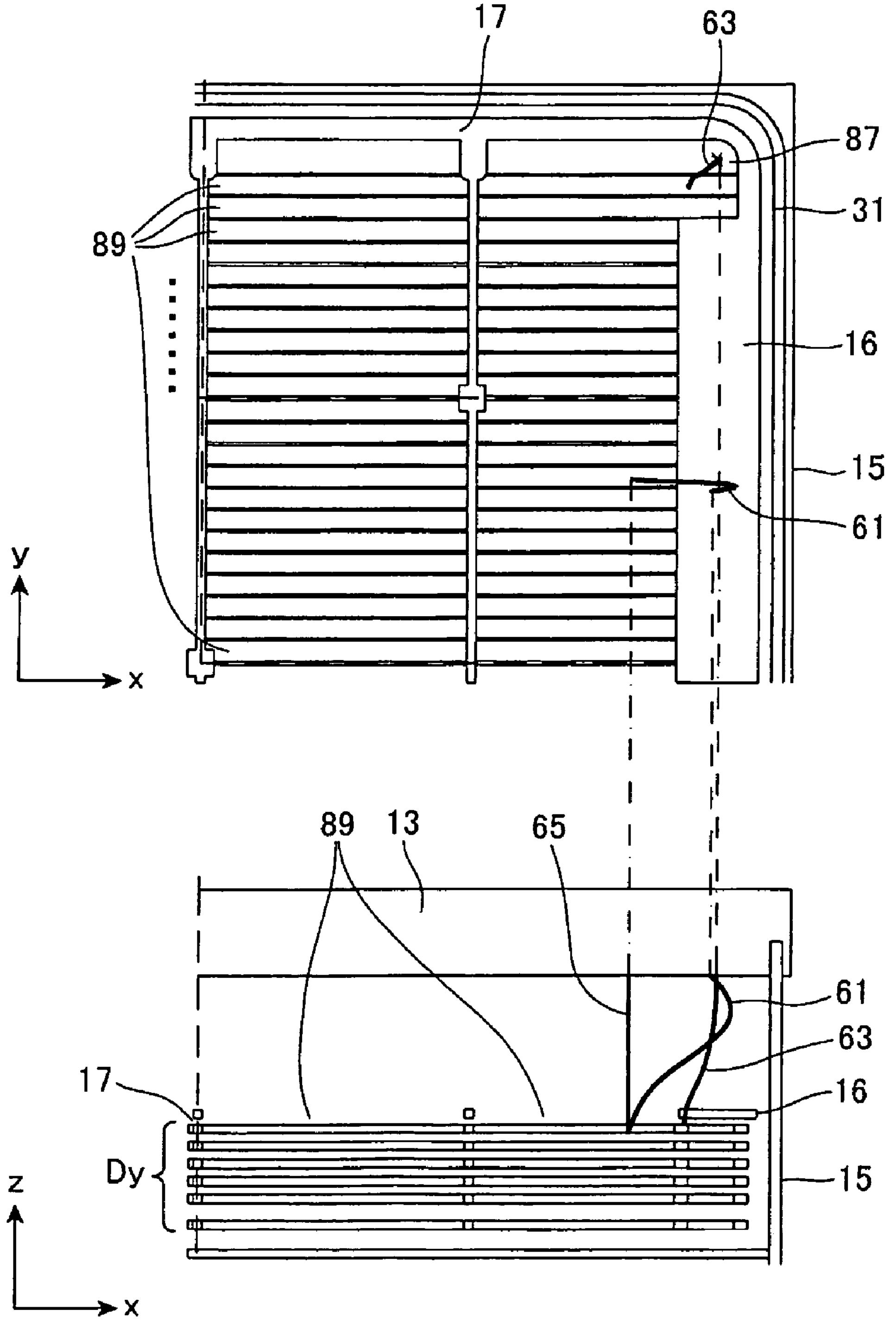
FIG. 14 is a view showing electron trajectories from a photocathode 14 to a dynode Dy1 projected on xy plane and on xz plane.

The outer shapes in the xy plane of the above-described focusing electrode 17, the dynodes Dy1-Dy12, the drawing electrode 19, and the anode 25 have effects on electron trajectories inside the photomultiplier tube 10. The effects will be described hereinafter. FIG. 14 is a view showing the electron trajectories from the photocathode 14 to the dynode Dy1 projected on the xy plane and on the xz plane. As shown in FIG. 14, an electron emitted from the peripheral section of the photocathode 14 in the x-axis direction is converged to an electron multiplying hole opening 89 by the flat-plate electrode section 16 provided with the focusing electrode 17 for covering the cutout portions 24 and 49, and enters the dynode Dy1 as indicated by a trajectory 61. Further, an electron emitted from a region of the photocathode 14 that confronts the corner section 87 is converged by the corner section 87 of the focusing electrode 17, and enters the corner section 85 of the dynode Dy1 as indicated by a trajectory 63. In this way, because the corner sections 87 and 85 of the focusing electrode 17 and the dynode Dy1 are provided, electrons emitted from the peripheral sections of the photocathode 14 enter the dynode Dy1 efficiently.

Incidentally, if the travel distances of electrons from the photocathode 14 to the dynode Dy1 differ, the output signals have timing difference. For example, an electron emitted from a position closer to the center of the photocathode 14 enters the dynode Dy1 as indicated by a trajectory 65. Although the trajectory 61 and the trajectory 65 enter approximately the same part of the dynode Dy1, their travel distances of electrons from the photocathode 14 to the dynode Dy1 are different, thereby generating time base difference in output signals. Additionally, an electron emitted from a region of the photocathode 14 that confronts the corner section 87 enters the center side of the dynode Dy in the x-axis direction in a slanted direction in the trajectory 63. Accordingly, if the corner sections 83, 85, and 87 are not provided to each electrode, that is, if the corner sections of each electrode are not effective areas, electrons emitted from the region of the photocathode 14 that confronts the corner section 87 need to be converged widely in order to make the electrons enter the dynode Dy1. Thus, the difference in travel distance between this trajectory and the trajectory 61 with respect to the trajectory 65 becomes even larger. However, in the present embodiment, the cutout portions 24 and 49 are provided for the dynodes Dy1-Dy12, the drawing electrode 19, and the anode 25, and the corner sections 83, 85, and 87 are configured to become effective areas for multiplying and detecting electrons. Hence, electrons are converged so that the difference in travel distance of electrons emitted from the regions of the photocathode 14 in opposition to the corner sections 83, 85, and 87 becomes shorter. Accordingly, timing difference of electrons that enter the dynode Dy1 in each trajectory 61, 63, and 65 can be suppressed to minimum.

Figure 15:
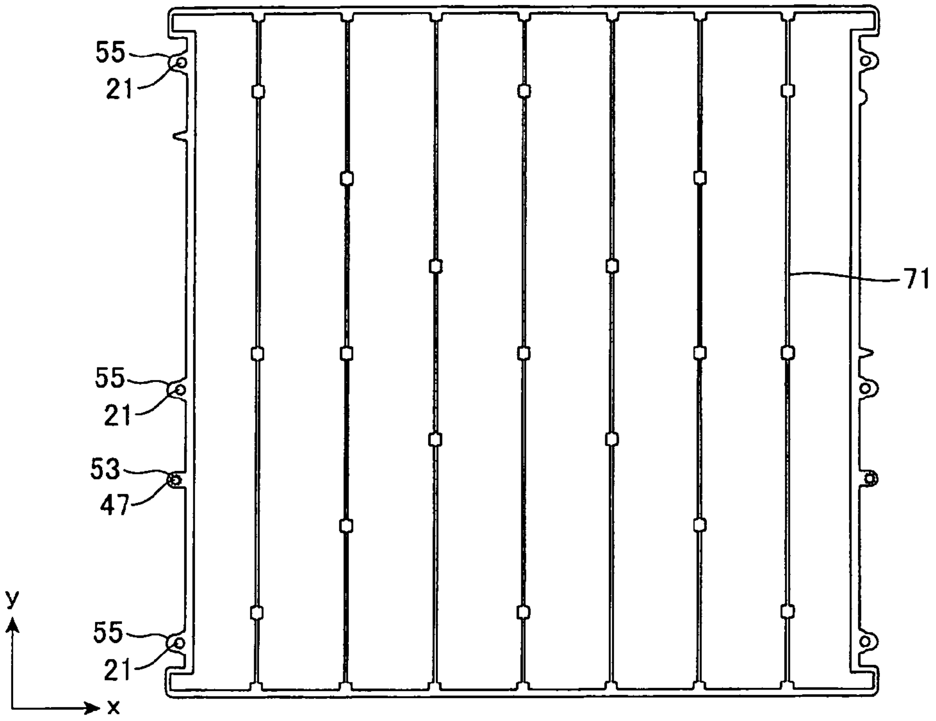
FIG. 15 is a view showing partition walls provided to a normal dynode.
Figure 16:
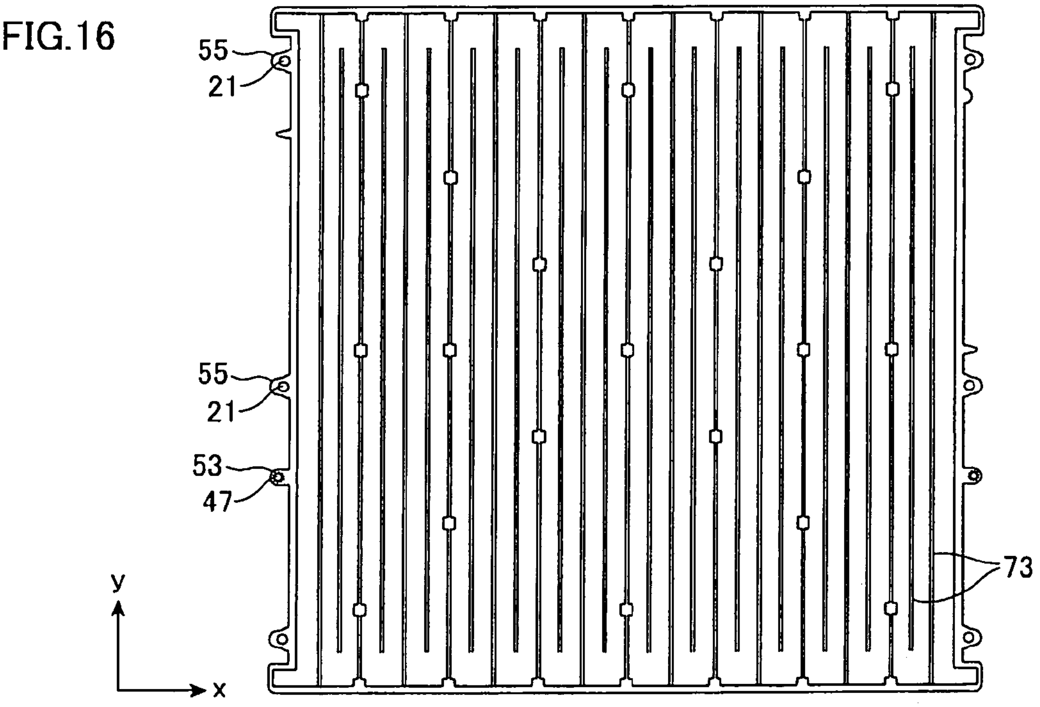
FIG. 16 is a view showing partition walls provided to a predetermined dynode.
Figure 17:
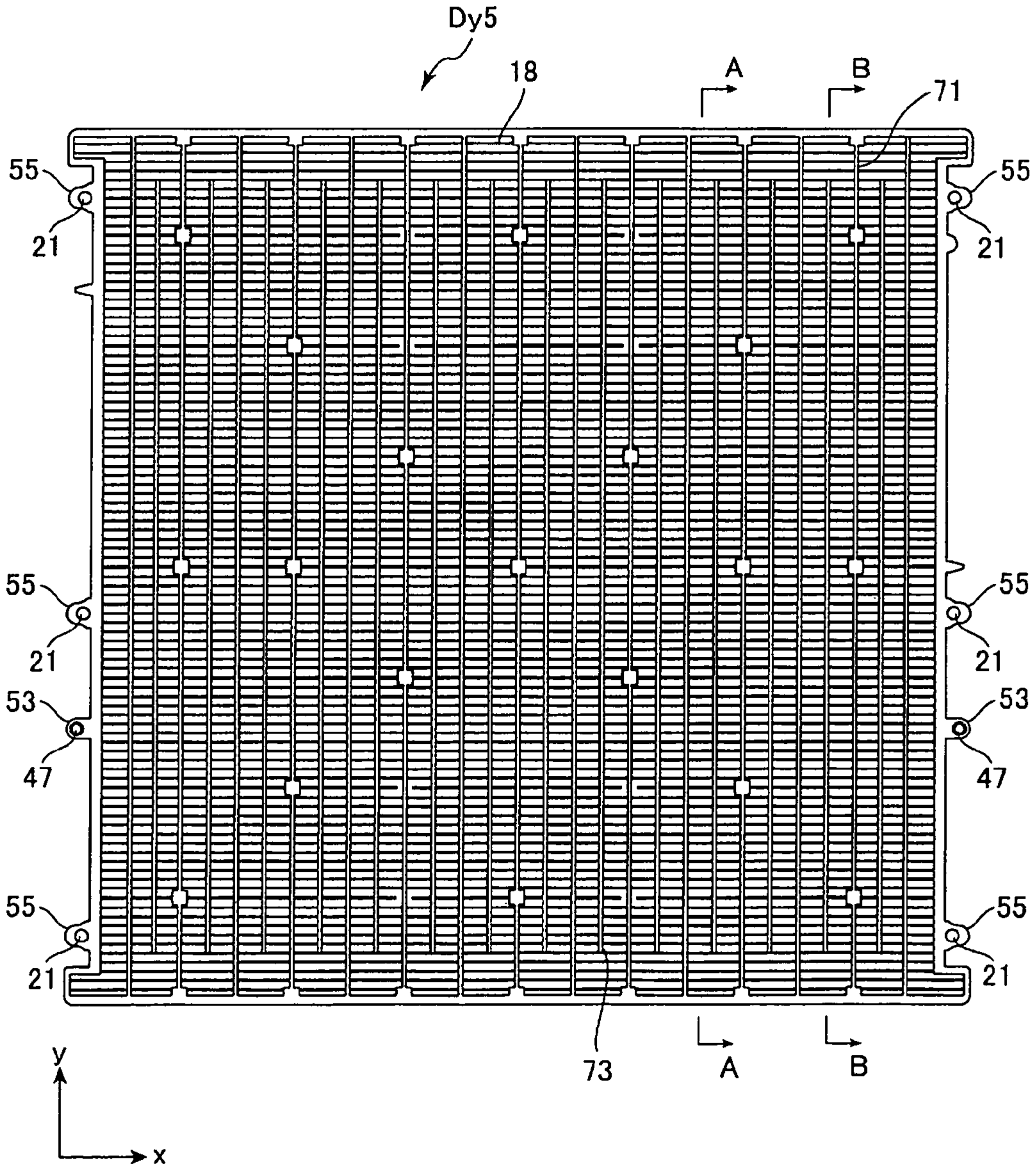
FIG. 17 is an overall view of a dynode provided with a large number of partition walls.
Figure 18:
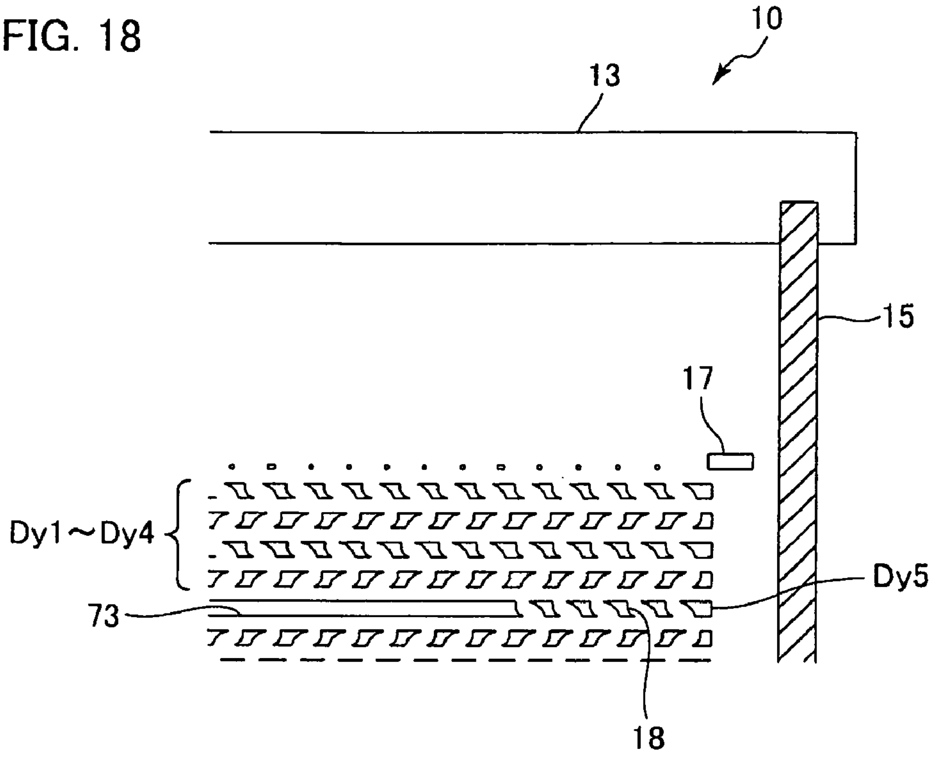
FIG. 18 is a cross-sectional view of FIG. 17.

Next, the configuration of partition walls provided to the dynodes Dy1-Dy12 will be described. FIG. 15 is a view showing partition walls provided to a normal dynode, FIG. 16 is a view showing partition walls provided to a predetermined dynode, FIG. 17 is an overall view of a dynode provided with a large number of partition walls, and FIG. 18 is a cross-sectional view of FIG. 17. Note that the electron multiplying pieces 18 are omitted in FIGS. 15 and 16.

Figure 19:
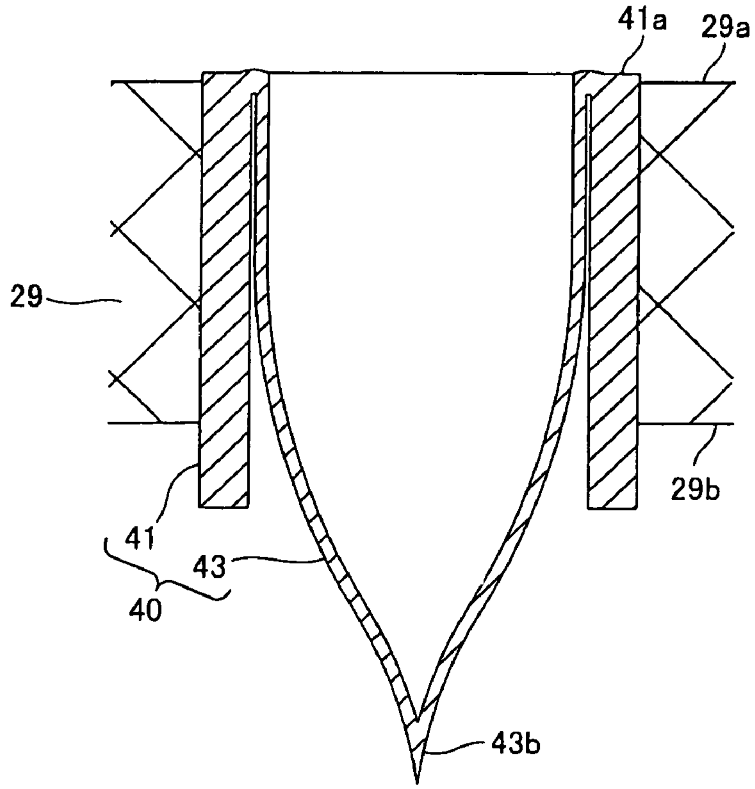
FIG. 19 is a cross-sectional view showing the configuration around an air discharging tube 40.

As described above, the dynodes Dy1-Dy12 in the present embodiment have slits formed in the x-axis direction. As shown in FIG. 15, the dynodes Dy1-Dy12 are provided with partition walls 71 in the y-axis direction, the partition walls 71 corresponding to the border sections in the y-axis direction of a plurality of channels of the anode 25. In the photomultiplier tube 10, in order to broaden the effective area of the faceplate 13, photoelectrons emitted from the peripheral sections of the photocathode 14 are converged toward the center of the xy plane in response to light incident on the proximity of the peripheral sections of the faceplate 13. Some of the electrons from the peripheral sections have been lost when converged. Consequently, uniformity of an electron multiplying ratio at t h e peripheral sections tends to decrease. Thus, as shown in FIGS. 16 and 17, partition walls 73 extending in the y-axis direction are provided in the dynode Dy except in the peripheral sections in the y-axis direction, thereby adjusting the electron multiplying ratio. With this configuration, in the A-A cross-section of FIG. 17, the electron multiplying pieces 18 exist in the entire electrode-layered unit. as shown in FIG. 7. In contrast, in the B-B cross-section, as shown in FIG. 18, the dynode Dy5 has the partition wall 73 except in the peripheral sections in the y-axis direction. The electron multiplying openings 18*a* are not formed in the partition walls 73, and thus electrons entering the partition walls 73 do not contribute to multiplication. Hence, electron multiplication is suppressed at the central portion in the xy plane, thereby enabling a uniform electron multiplying ratio to be produced Next, the configuration of the air discharging tube 40 will be described. FIG. 19 is a cross-sectional view showing the configuration around the air discharging tube 40. The air discharging tube 40 is hermetically joined to the central portion of the stem 29. The air discharging tube 40 has a double-tube structure of an inner side tube 43 and an outer side tube 41. The outer side tube 41 is formed of Kovar metal, for example, having good adhesion with glass and the same thermal expansion coefficient, for tightly connecting to the stem 29. The outer side tube 41 has, for example, a thickness of 0.5 mm, an outer diameter of 5 mm, and a length of 5 mm. Note that a thickness of the stem 29 can be 4 mm, for example. In this case, the outer side tube 41 protrudes from the outer surface 29*b* of the stem 29 outward by 1 mm. Because the outer side tube 41 protrudes outward from the outer surface 29*b*, it is prevented that the stem 29 goes beyond the outer side tube 41 and enters between the inner side tube 43 and the outer side tube 41. Further, in order to facilitate sealing (pressure welding), the air discharging tube 40 is configured in such a manner that the inner side tube 43 protrudes from the lower end of the outer side tube 41 even after sealing is completed.

The inner side tube 43 is formed of Kovar metal or copper, for example. The inner side tube 43 has, for example, an outer diameter of 3.8 mm and a length prior to cutting of 30 mm. The inner side tube 43 is coaxially arranged with the outer side tube 41. One end section of the inner side tube 43 at the inner surface 29*a* side of the stem 29 is hermetically joined to the outer side tube 41. Further, because the other end section of the inner side tube 43 is hermetically sealed at the end of manufacture of the photomultiplier tube 10, it is preferable that the thickness of the inner side tube 43 be as thin as possible and be 0.15 mm, for example. A connecting section 41*a* that is connected to the stem 29 is arranged so that the connecting section 41*a* protrudes upward in the z-axis direction by 0.1 mm, for example, in order to prevent material of the stem 29 from entering inside of the air discharging tube 40.

Figure 20:
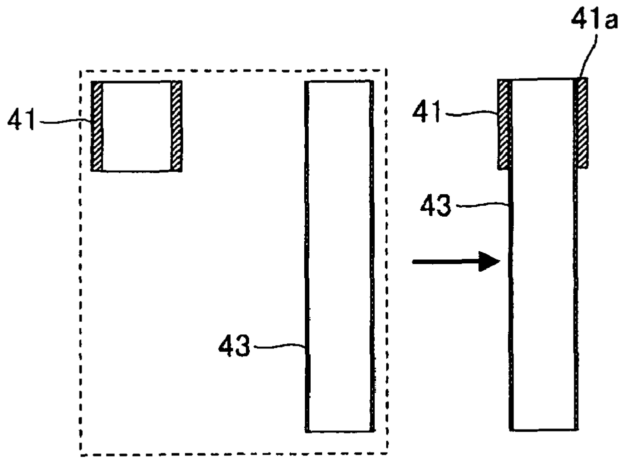
FIG. 20 is a view showing a method of manufacturing the air discharging tube 40 and the stem 29.
Figure 21:
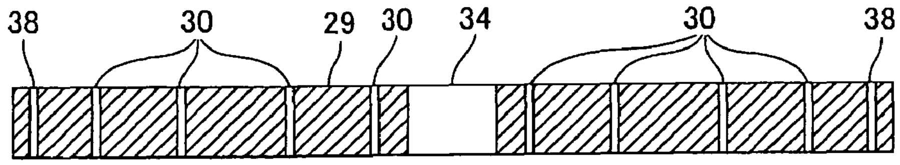
FIG. 21 is a view showing the method of manufacturing the air discharging tube 40 and the stem 29.
Figure 22:
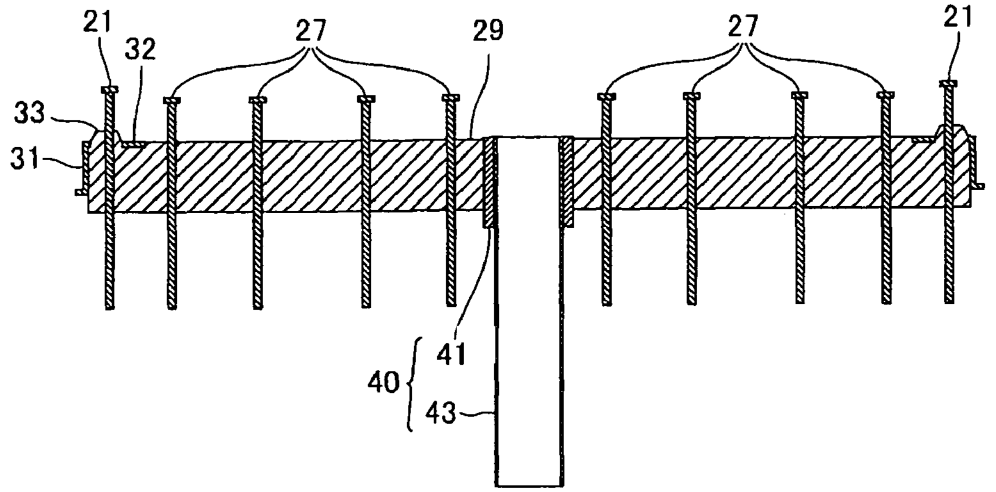
FIG. 22 is a view showing the method of manufacturing the air discharging tube 40 and the stem 29.

Next, the method of manufacturing the photomultiplier tube 10 will be described. FIGS. 20 through 22 are diagrams showing the method of manufacturing the air discharging tube 40 and the stem 29. As shown in FIG. 20, first, the outer side tube 41 and the inner side tube 43 are prepared. Subsequently, the inner side tube 43 is arranged coaxially inside the outer side tube 41. At this time, the positions of one end of the inner side tube 43 and one end of the outer side tube 41 are aligned with each other, and the connecting section 41*a* is joined by laser-welding. After joined, an oxide film is formed on the outer surface of the outer side tube 41 for facilitating fusion bonding with the stem 29 Further, the tubular member 31 and the extending section 32 are prepared, on which oxide films are formed for facilitating fusion bonding with the stem 29. As shown in FIG. 21, a predetermined number of through-holes 38 for mounting the supporting pins 21, a predetermined number of through-holes 30 for mounting the stem pins 27 and the like, and one though-hole 34 for mounting the air discharging tube 40 are formed in the stem 29.

As shown in FIG. 22, the air discharging tube 40, the tubular member 31, the extending section 32, the stem 29, the supporting pins 21, the stem pins 27, the lead pins 47, and the like are arranged at the positions indicated by the drawing, respectively, and are placed on a carbon jig (not shown). The stem 29 is then sintered while the inner surface 29*a* side and the outer surface 29*b* side of the stem 29 are pinched and pressed by the jig, thereby allowing glass and each metal to be hermetically fusion bonded. At this time, the material of the stem 29 is pushed out to the connection section where the supporting pins 21 and the lead pins 47 inserted in the through-hole sections 22 and 48 of the extending section 32 are connected to the stem 29, thereby forming the protuberant section 33. After fusion bonding, the jig is removed, and removal of the oxide films and cleaning are performed. In this way, the stem section is completed.

Subsequently, the integrally-formed anode 25 is placed on the stem pins 27 and fixed. After fixing, the bridges are cut off so that the anode 25 can become independent as the anodes 25(1-1), 25(1-2), . . . , 25(8-8). The drawing electrode 19 is placed on the supporting pins 21 such that the drawing electrode 19 can be substantially parallel to and spaced away from the anodes 25. Further, the electrode-layered unit is placed on the drawing electrode 19. In the electrode-layered unit, dynodes Dy12-Dy1 and the focusing electrode 17 are sequentially arranged in confrontation with each other, while spaced away from each other via the insulating members 23. At this time, the lead pins 47 corresponding to respective ones of the dynodes Dy1-Dy12 are connected to the protruding portions 53, the focusing electrode 17 is connected to the focus pin 51, and pressure is applied downward in the z-axis direction for fixation. Thereafter, the end section of the side tube 15 which has been fixed to the faceplate 13 at the other end thereof is welded to the tubular member 31, assembling the photomultiplier tube.

Next, after air inside of the photomultiplier tube 10 is discharged through the air discharging tube 40 by a vacuum pump or the like, alkali vapor is introduced thereinto to activate the photocathode 14 and the secondary electron surface. After air inside of the photomultiplier tube 10 is discharged again and evacuated, the inner side tube 43 constituting the air discharging tube 40 is cut to a predetermined length and the distal end thereof is sealed. At this time, it is preferable that the inner side tube 43 be cut short to such a degree that the bond between the stem 29 and the connecting section 41*a* can not be harmed, so that the inner side tube 43 may not become impediment when the radiation detecting device 1 is placed on a circuit board. Throughout the above-described processes, the photomultiplier tube 10 is obtained.

In the radiation detecting device 1 according to the present embodiment having the above-described configuration, when radiation is incident on the incident surface 5 of the scintillator 3, light is outputted from the output surface 7 side in response to the radiation. When light outputted by the scintillator 3 is incident on the faceplate 13 of the photomultiplier tube 10, the photocathode 14 emits electrons in response to the incident light. The focusing electrode 17 provided in confrontation with the photocathode 14 converges the electrons emitted from the photocathode 14 to enter the dynode Dy1. The dynode Dy1 multiplies the incident electrons and emits secondary electrons to the dynode Dy2 located at the below stage. In this way, the electrons multiplied sequentially by the dynodes Dy1-Dy12 reach the anode 25 via the drawing electrode 19. The anode 25 detects the reached electrons and outputs signals to outside through the stem pins 27.

As shown in FIG. 5, the photomultiplier tube 10 includes the supporting pins 21 for placing the electrode-layered unit thereon. Because of the configuration that the electrode-layered unit is placed on the placing surfaces of the placing sections 21*b* constituting the supporting pins 21, large pressure can be applied from the upper side of the electrode-layered unit in the z-axis direction for fixation. Hence, the fixing strength of the electrode-layered unit increases and the anti-vibration performance improves. In addition, the positioning accuracy of the electrode-layered unit (each electrode constituting the electrode-layered unit) in the z-axis direction increases. Further, the drawing electrode 19, which is the lowest stage electrode of the electrode-layered unit, is placed on and supported by the placing sections 21*b* of the supporting pins 21, and there is no insulator between the drawing electrode 19 and the anode 25. Hence, it. can be prevented that electrons collide on an insulator and emit light. Accordingly, generation of noise in the signals outputted from the anode 25 can also be prevented. Additionally, because the supporting pins 21 are formed of an electrically-conductive material, the supporting pins 21 do not emit light even if electrons collide on the supporting pins 21, thereby further preventing noise from being generated.

The focusing electrode 17, the dynodes Dy1-Dy12, and the drawing electrode 19 are stacked in confrontation with and separated away from each other via the insulating members 23 that are coaxially arranged with the supporting pins 21. Thus, because higher pressure can be applied in the z-axis direction to fix the focusing electrode 17, the dynodes Dy1-Dy12, and the drawing electrode 19, the anti-vibration performance further improves. Further, accurate positioning of each electrode in the xy plane can be realized, by stacking the focusing electrode 17, the dynodes Dy1-Dy12, and the drawing electrode 19 via the insulating members 23.

Because the focusing electrode 17 is provided at the photocathode 14 side of the dynodes Dy1-Dy12, electrons emitted from the photocathode 14 can be incident on the dynode Dy1 efficiently.

As shown in FIGS. 8 and 10, the dynodes Dy1-Dy12, the drawing electrode 19, and the anode 25 are provided with the cutout portions 49 and 24, and the supporting pins 21 and the lead pins 47 are arranged in the cutout portions 49 and 24. Thus, the effective area of each electrode can be sufficiently preserved, and fluctuations in signals due to the difference in traveling time of electrons or the like can be minimized. Additionally, the lead pins 47 extend in the z-axis direction, and the cutout portions 49 and 24 formed in the dynodes Dy1-Dy12, the drawing electrode 19, and the anode 25 overlap in the z-axis direction. Therefore, the effective areas can further be preserved.

Further, as shown in FIG. 12, because the focusing electrode 17 is provided to the peripheral sections in the xy plane for covering the cutout portions 49 of the dynodes Dy1-Dy12, it is possible to converge electrons to the effective area of the dynode Dy1, the electrons being emitted from the regions of the photocathode 14 corresponding to the cutout portions 49 and 24 formed in the dynodes Dy1-Dy12, the drawing electrode 19, and the anode 25. Thus, it is ensured that the photomultiplier tube 10 can have a large effective area for detecting light. At the same time, it is prevented that collision of electrons on the lead pins 47 may decrease the multiplying ratio.

Further, as shown in FIG. 14, the openings 17*b* of the focusing electrode 17 extend in the x-axis direction, that is, the direction perpendicular to the peripheral sections where the cutout portions 49 and 24 of the drawing electrode 19 and the anode 25 are formed. Although it is preferable that as many electrons as possible enter the openings 17*b*, the electrons that impinge against the focus pieces 17*a* do not enter the openings 17*b*. Accordingly, it is preferable that the trajectories of electrons be controlled to avoid the focus pieces 17*a*. Especially, it is preferable that the trajectories of electrons that enter from a part of the photocathode 14 in confrontation with the flat-plate electrode section 16 be controlled to avoid the flat-plate electrode section 16 as well. At that time, the electrons that enter from the part in confrontation with the flat-plate electrode section 16 travel in the x-axis direction as indicated by the trajectory 61. However, the control in the x-axis direction, that is, the direction in which the electrons originally travel is more difficult than the control in the y-axis direction. Accordingly, in the present embodiment, the openings 17*b* extend in the x-axis direction, that is, the direction perpendicular to the peripheral sections where the cutout portions 49 and 24 of the drawing electrode 19 and the anode 25 are formed. Hence, electrons can be made to enter the openings 17*b* efficiently, by performing the control in the y-axis direction which is relatively easy.

Further, as shown in FIG. 5, since the drawing electrode 19 is provided between the last stage dynode Dy12 and the anode 25, the electric field intensity at the lower side of the dynode Dy12 in the z-axis direction can be made uniform. Hence, the electron emitting characteristics of the dynode Dy12 is made uniform. Accordingly, for example, even if each unit anode is slanted after the bridges are cut off and the distances between each of the anodes 25 and the drawing electrode 19 vary, electrons can be drawn from the dynode Dy12 uniformly for each channel region.

In addition, as shown in FIGS. 16 and 18, the partition walls 73 are provided to the dynode Dy located at a predetermined stage to adjust an opening ratio, thereby reducing variations of the electron multiplying ratio in the xy plane.

The anode 25 is integrally formed, and the unit anode 25 is made independent by cutting off the bridges after each anode is fixed to the corresponding stem pin 27. Hence, the step of placing the anode 25 on the stem pins 27 can be simplified, and the positioning accuracy of setting each anode 25 increases. Further, as shown in FIGS. 8 and 9, because the bridges are provided within the concave portions 28, the effective areas of the anode 25 can be sufficiently preserved. Further, because the bridge remaining sections 26 are disposed within the concave portions 28, electric discharge between the bridge remaining sections 26 can be prevented. In addition, because the multiple anodes arranged two-dimensionally in this way are used, the incident positions of light in the xy plane can be detected.

As shown in FIG. 3, the stem 29 is formed of glass. The tubular member 31 is provided at the peripheral section 29*c* of the stem 29, and the extending section 32 is provided on the inner surface 29*a* of the stem 29. The supporting pins 21 and the lead pins 47 penetrate in the extending section 32, and the focus pin 51 is erected in the extending section 32. Hence, each pin can be provided near the side tube 15, and thus the effective area of each electrode can be sufficiently preserve.

Additionally, as shown in FIG. 6, since the protuberant section 33 is formed at the connection section where the stem 29 is connected to the supporting pins 21 and the lead pins 47, the creepage distance between the tubular member 31 and each pin can be made long. This configuration can prevent occurrence of creeping discharge as well as occurrence of noises due to emission of light generated when multiplied electrons collide on an insulating object. Additionally, because the through-hole sections 22 and 48 are provided at the extending section 32, the through-hole sections 22 and 48 function as an adjustive part for glass material during manufacture of the stem 29, thereby facilitating adjustment of the thickness of the stem 29. Further, because the thickness of the stem 29 can be controlled in this way, the positioning accuracy of the outer surface 29*b* of the stem 29 relative to the faceplate 13 increases. Consequently, the dimensional accuracy of the overall length of the photomultiplier tube 10 improves. Hence, for example, when the photomultiplier tube 10 is surface-mounted on a circuit board or the like for use, the distance between a light source and the faceplate 13 of the photomultiplier tube 10 becomes constant, enabling detection of light with less error.

Further, as shown in FIG. 19, the air discharging tube 40 provided to the stem 29 has a double-tube structure, where the outer side tube 41 is thickly formed of a material having good adhesiveness with the stem 29, and the inner side tube 43 is thinly formed of a soft material With such a double-tube structure, generation of a pinhole and the like during laser welding can be prevented owing to the thickness of the outer side tube 41. Further, the inner side tube 43 can be connected to the outer side tube 41 only at the end section at the inner surface 29*a* side of the stem 29. The inner side tube 43 can be cut short and sealed to a degree that the connection section is not. damaged and the length does not become an impediment when placed on a circuit board, while the outer side tube 41 ensures close contact with the stem 29. Also, the inner side tube 43 may be made of a material having good sealing characteristics for easy sealing. Further, the tube diameter of the air discharging tube 40 may be made large. When alkali metal vapor is introduced, the processing time can be shortened and the uniformity of the introduced vapor improves.

Further, as shown in FIG. 1, because the scintillator 3 is provided at the faceplate 13 side of the photomultiplier tube 10, it is possible to detect radiation and to output signals.

Figure 23:
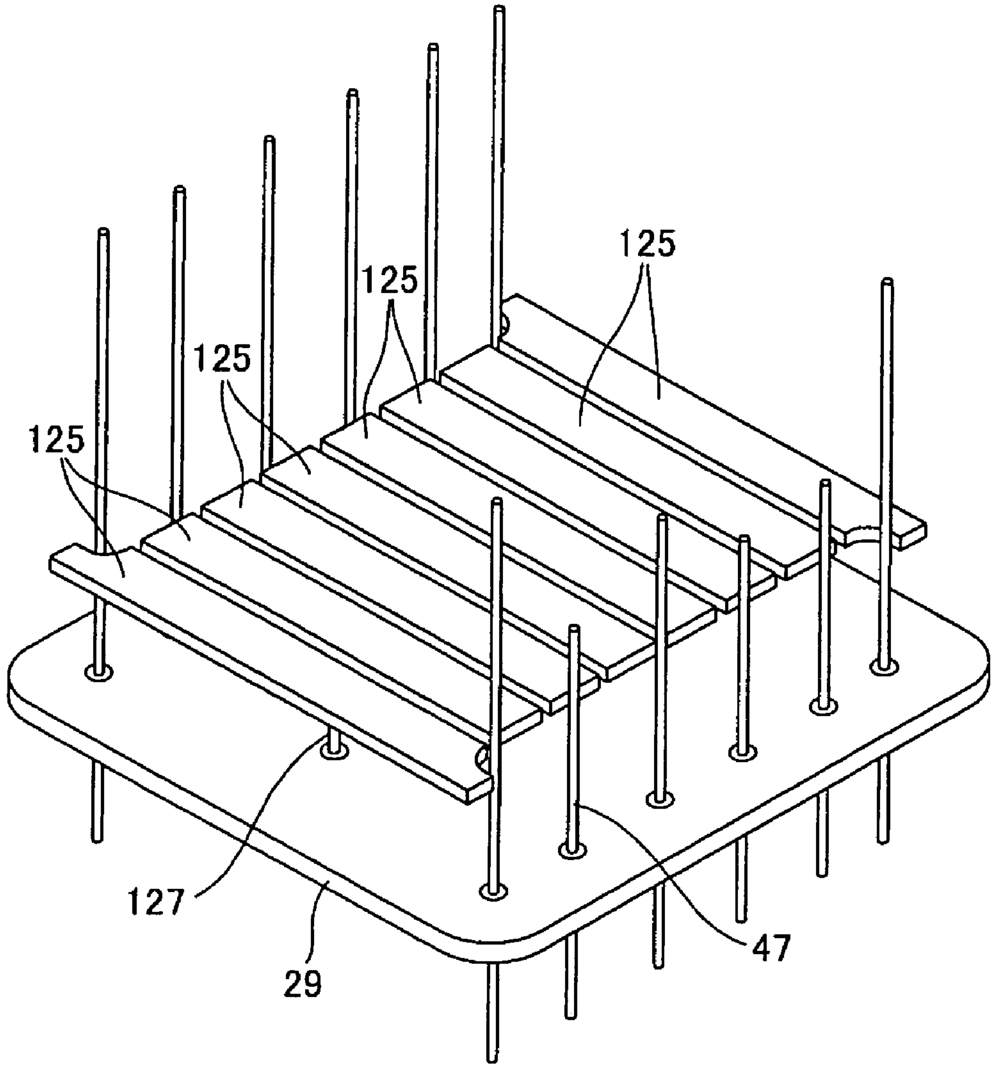
FIG. 23 is a perspective view showing an anode 125 according to a first modification.

Next, a first modification will be described while referring to FIG. 23. FIG. 23 is a perspective view showing an electron detecting section according to the modification. Although the anode 25 constituting the electron detecting section is multiple anodes arranged two-dimensionally in the above-described embodiment, linear anodes 125 are arranged one-dimensionally in the first modification. The border sections of the linear anodes 125 are provided at positions corresponding to the partition walls 71 of the dynodes Dy1-Dy12. Each linear anode 125 is connected to and supported by a stem pin 127 that penetrates the stem 29, and applied with a predetermined electric potential and outputs signals in response to detected electrons. It is preferable that the linear anode 125 be also provided with concave portions (not shown) having bridges at parts that confront the adjacent unit anodes, and that the bridges be cut off after the entire linear anode 125 is fixed on the stem pins 127.

Figure 24:
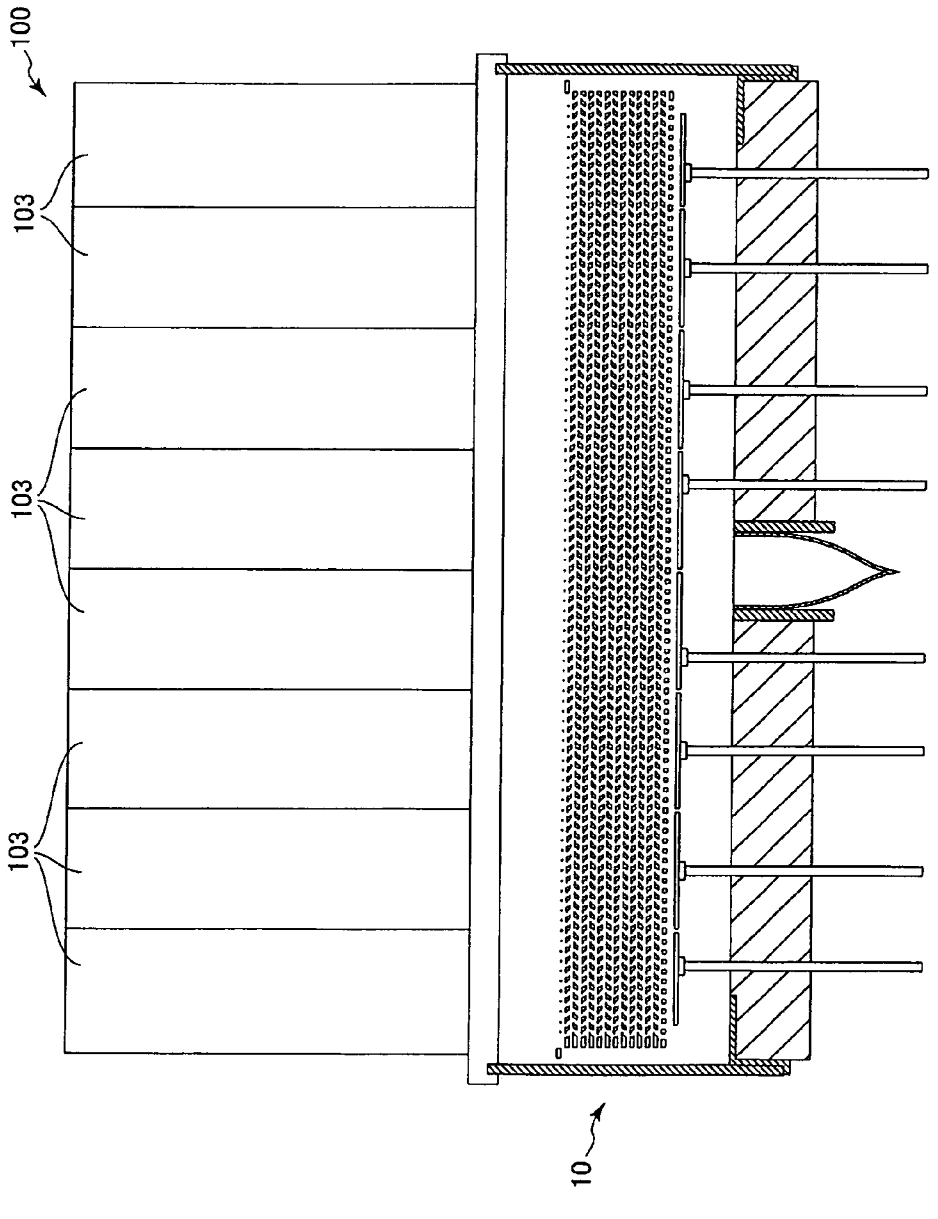
FIG. 24 is a schematic cross-sectional view showing a radiation detecting device 100 according to a second modification.

Next, a second modification will be described while referring to FIG. 24. FIG. 24 is a schematic cross-sectional view showing a radiation detecting device 100 according to the modification of the scintillator. Instead of the scintillator 3 according to the above-described embodiment, a plurality of scintillators 103 having a size corresponding to the channel region of the photomultiplier tube 10 is arranged one-dimensionally in the radiation detecting device 100. The other configurations are identical to the first modification. According to this configuration, the incident positions of radiation in the xy plane can be detected.

Figure 25:
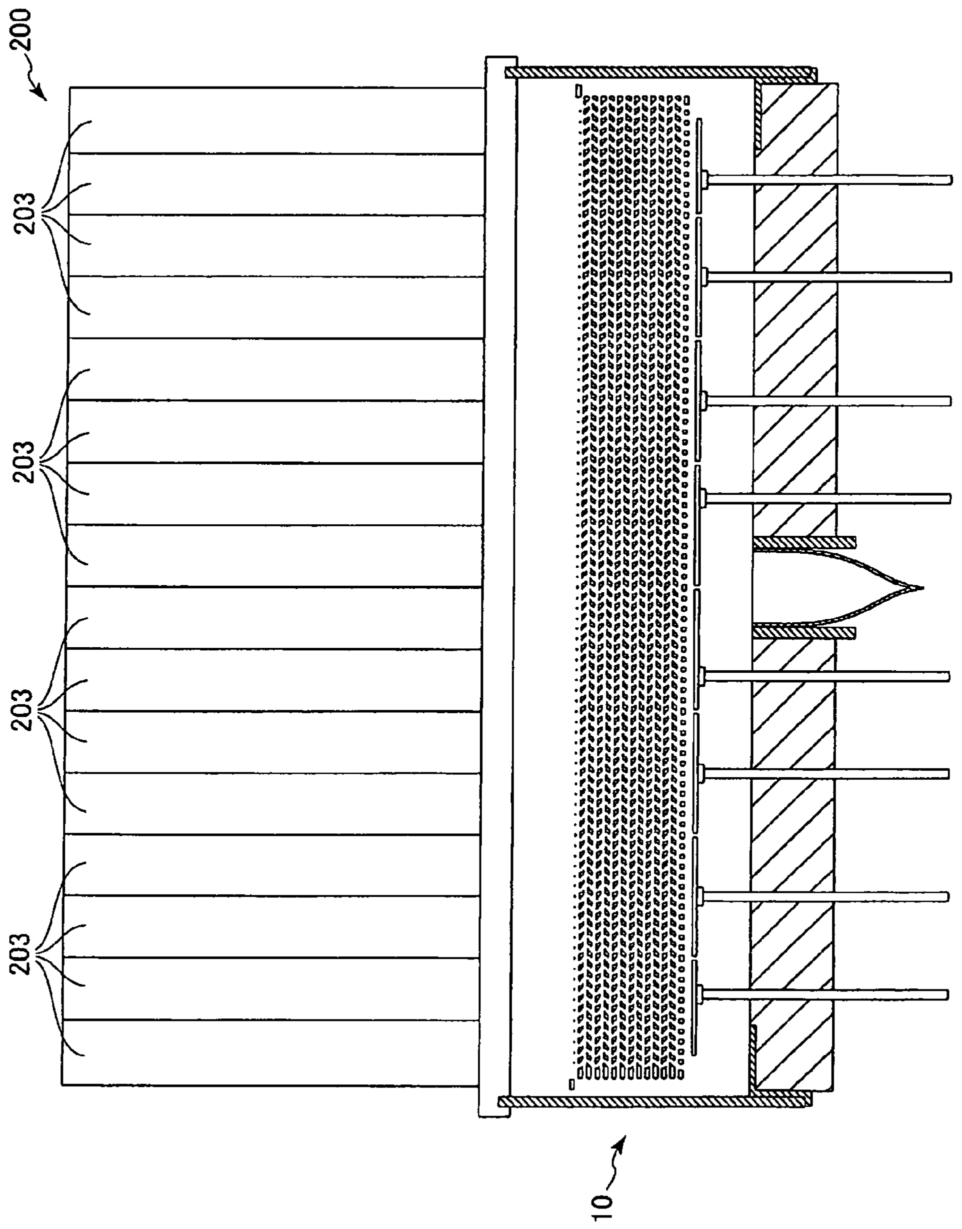
FIG. 25 is a schematic cross-sectional view showing a radiation detecting device 200 according to a third modification.

Next, a third modification will be described while referring to FIG. 25. FIG. 25 is a schematic cross-sectional view showing a radiation detecting device 200 according to another modification of the scintillator. Instead of the scintillator 103 according to the second modification, a plurality of scintillators 203 having a size smaller than the anode 125, for example, corresponding to one half of the anode 125 is arranged one-dimensionally in the radiation detecting device 200. The other configurations are identical to the second modification. According to this configuration, the incident positions of radiation in the xy plane can be detected more accurately.

Figure 26:
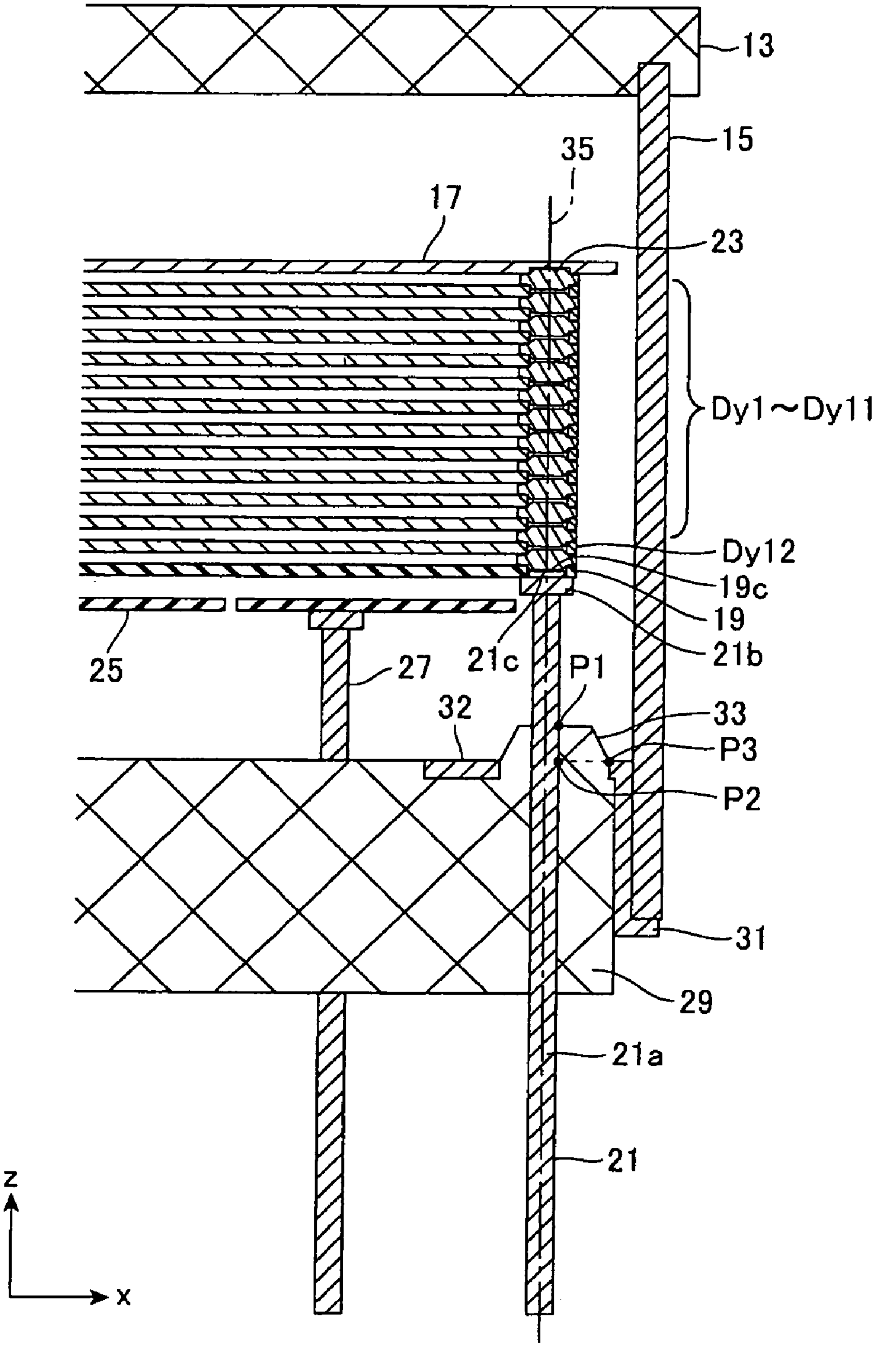
FIG. 26 is a schematic cross-sectional view showing the radiation detecting device 100 according to a fourth modification.

Next, a fourth modification will be described while referring to FIG. 26 FIG. 26 is an explanatory diagram of the shapes of the placing section 21*b* and the drawing electrode 19 according to the modification. A convex portion 21*c* is formed on the surface of the placing section 21*b* for placing the drawing electrode 19 thereon. A concave portion 19*c* is formed on the surface of the drawing electrode 19 that is placed on the placing section 21*b*. When the drawing electrode 19 is placed on the supporting pin 21, the convex portion 21*c* and the concave portion 19*c* are engaged with each other. According to this configuration, the positioning accuracy of the electrode-layered unit including the focusing electrode 17 and the plurality of dynodes Dy1-Dy12 in the xy plane can improve. Note that, if the drawing electrode 19 is not provided, a concave portion may be formed in the last stage dynode Dy12. Alternatively, a concave portion may be formed in the placing section 21*b*, and a convex portion may be formed in the drawing electrode 19.

It would be apparent that the photomultiplier tube and the radiation detecting device according to the present invention are not limited to the above-described embodiments, and that various changes and modifications may be made therein without departing from the spirit of the present invention.

For example, although the extending section 32 of the tubular member 31 extends at the inner surface 29*a* side of the stem 29, the extending section 32 may be provided at the outer surface 29*b* side. In that case, the electric potential of the photocathode 14 is exposed to the periphery of the extending section 32 and to the lead pins 47 penetrating the extending section 32. A circuit board is often arranged closely at the outside of the stem 29. Hence, if the electric potential of the photocathode 14, which has the largest potential difference relative to the anode 25, is exposed, there is a possibility that a problem in terms of withstand voltage may arise. Accordingly, the extending section 32 is preferably located internally.

In the manufacturing method, the air discharging tube 40 is connected to the stem 29 after the outer side tube 41 and the inner side tube 43 are connected. There is also a method in which only the outer side tube 41 is first oxidized and is connected to the stem 29, and an oxide film is subsequently removed. The inner side tube 43 is then connected to the outer side tube 41.

Although the cross-sections of the photomultiplier tube and each electrode have substantially rectangular shapes, the cross-sections may have circular or other shapes. In this case, it is preferable that the shape of the scintillator be modified depending on the shape of the photomultiplier tube.

The partition walls 73 are provided to the fifth stage dynode Dy5 in the. above-described example. However, the partition walls 73 may be provided to another stage, or may be provided to a plurality of stages of dynodes.

The openings l9*b* of the drawing electrode 19 are not limited to a linear shape, but may be a meshed shape.

Figure 27:
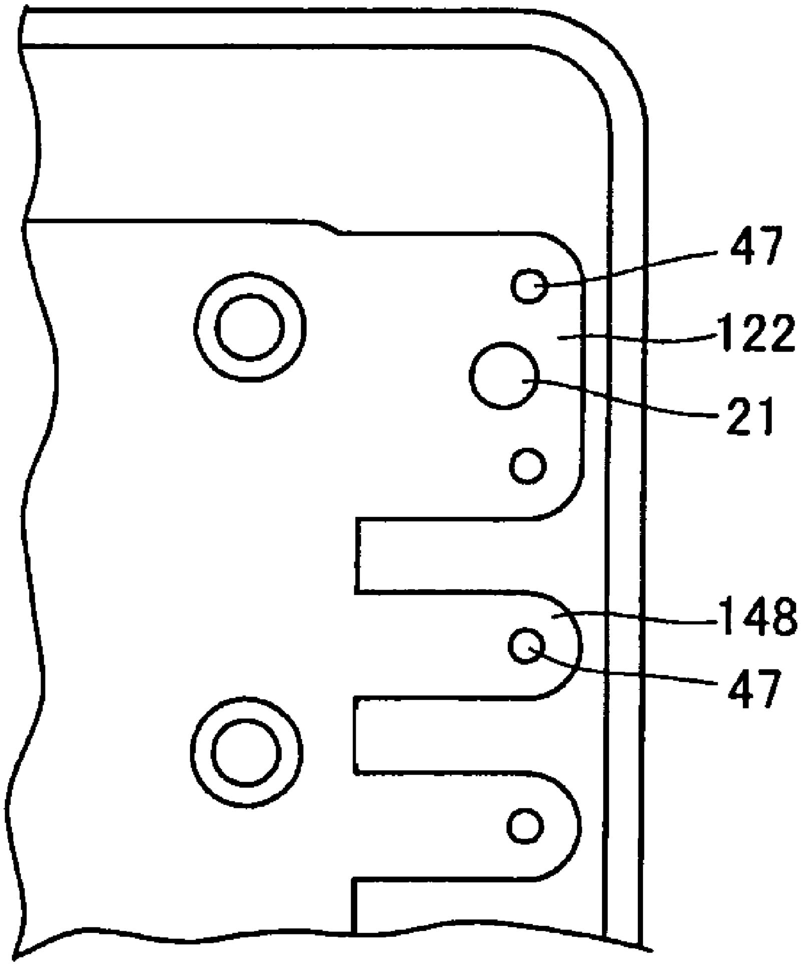
FIG. 27 is a plan view showing a modification of the shape of an opening part of the extending section 32.

As shown in FIG. 27, instead of the through-hole sections 22 and 48, a plurality of openings 122 and 148 may be formed with a comb-like shape at the both peripheral sections of the extending section 32 in the x-axis direction. With the plurality of openings 122 and 148 formed with the comb-like shape, the degree of improvement in strength of the stem 29 by the extending section 32 becomes slightly low compared to the through-hole sections 22 and 48. In addition, because the adjustive part for the material of the stem 29 from the open portions becomes larger, forming the protuberant section 33 is slightly harder. However, in this case as well, the effective area of the electron multiplying section and the electron beam detecting section can be preserved efficiently.

INDUSTRIAL APPLICABILITY

The radiation detecting device of the present invention is applicable to an image diagnostic apparatus in medical devices and the like.

The invention claimed is:

1. A photomultiplier tube comprising:

a vacuum vessel having a faceplate constituting one end and a stem constituting another end;

a photocathode that converts incident light incident through the faceplate to electrons;

an electron multiplying section that multiplies the electrons emitted from the photocathode; and an electron detecting section that transmits output signals in response to electrons from the electron multiplying section, wherein the photocathode, the electron multiplying section, and the electron detecting section are provided within the vacuum vessel, wherein the electron multiplying section includes an electrode-layered unit in which electrodes including dynodes that constitute a plurality of channels are stacked in a plurality of stages in a stacking direction;

wherein the electron detecting section includes a plurality of anodes that is arranged spaced away from and in confrontation with a last stage electrode of the electrode-layered unit and that is arranged in association with the channels; and wherein the stem is provided with a supporting portion that penetrates through the stem and is fixed to the stem, the supporting portion having a first end face and a second end face opposite the first end face, the last stage electrode being placed on the first end face, and the second end face being exposed to outside of the vacuum vessel.

2. The photomultiplier tube as claimed in claim 1, wherein the plurality of stages of electrodes is stacked with an insulator interposed between two adjacent electrodes; and wherein the insulator and the supporting portion are arranged coaxially.

3. The photomultiplier tube as claimed in claim 1, wherein the last stage electrode comprises a drawing electrode having an opening that allows the electrons emitted from the dynodes to reach the anodes.

4. The photomultiplier tube as claimed in claim 1, wherein the plurality of anodes is a multiple anode configured of unit anodes arranged two-dimensionally.

5. The photomultiplier tube as claimed in claim 1, wherein the supporting portion is formed of an electrically-conductive material.

6. The photomultiplier tube as claimed in claim 1, wherein the supporting portion comprises a supporting section that extends from the stem in the stacking direction; and wherein the first end face has an area larger than a cross-sectional area of the supporting section in a plane perpendicular to the stacking direction.

7. The photomultiplier tube as claimed in claim 6, wherein the first end face is formed with a first engaging section on which the last stage electrode is placed;

wherein the last stage electrode is formed with a second engaging section that is placed on the first end face; and wherein the first engaging section and the second engaging section are engaged with each other when the last stage electrode is placed on the supporting portion.

8. The photomultiplier tube as claimed in claim 1, wherein the plurality of anodes is a plurality of linear anodes extending in an extending direction, the linear anodes being arranged in a direction perpendicular to the extending direction one-dimensionally.

9. The photomultiplier tube as claimed in claim 1, further comprising a plurality of potential applying pins that is fixed to the stem, the potential applying pins applying potentials to the electrodes constituting the electrode-layered unit.

10. A radiation detecting device comprising:

a photomultiplier tube having a faceplate; and a scintillator disposed outside of the faceplate of the photomultiplier tube, the scintillator converting radiation to light and outputting the light, wherein the photomultiplier tube comprises:

a vacuum vessel having the faceplate constituting one end and a stem constituting another end;

a photocathode that converts incident light incident through the faceplate to electrons;

an electron multiplying section that multiplies the electrons emitted from the photocathode; and an electron detecting section that transmits output signals in response to electrons from the electron multiplying section, wherein the photocathode, the electron multiplying section, and the electron detecting section are provided within the vacuum vessel, wherein the electron multiplying section includes an electrode-layered unit in which electrodes including dynodes that constitute a plurality of channels are stacked in a plurality of stages in a stacking direction;

wherein the electron detecting section includes a plurality of anodes that is arranged spaced away from and in confrontation with a last stage electrode of the electrode-layered unit and that is arranged in association with the channels; and wherein the stem is provided with a supporting portion that penetrates through the stem and is fixed to the stem, the supporting portion having a first end face and a second end face opposite the first end face, the last stage electrode being placed on the first end face, and the second end face being exposed outside of the vacuum vessel.

11. The radiation detecting device as claimed in claim 10, wherein the plurality of stages of electrodes is stacked with an insulator interposed between two adjacent electrodes; and wherein the insulator and the supporting portion are arranged coaxially.

12. The radiation detecting device as claimed in claim 10, wherein the last stage electrode comprises a drawing electrode having an opening that allows the electrons emitted from the dynodes to reach the anodes.

13. The radiation detecting device as claimed in claim 10, wherein the plurality of anodes is a multiple anode configured of unit anodes arranged two-dimensionally.

14. The radiation detecting device as claimed in claim 10, wherein the supporting portion is formed of an electrically-conductive material.

15. The radiation detecting device as claimed in claim 10, wherein the supporting portion comprises a supporting section that extends from the stem in the stacking direction; and wherein the first end face has an area larger than a cross-sectional area of the supporting section in a plane perpendicular to the stacking direction.

16. The radiation detecting device as claimed in claim 15, wherein the first end face is formed with a first engaging section on which the last stage electrode is placed;

wherein the last stage electrode is formed with a second engaging section that is placed on the first end face; and wherein the first engaging section and the second engaging section are engaged with each other when the last stage electrode is placed on the supporting portion.

17. The radiation detecting device as claimed in claim 10, wherein the photomultiplier tube further comprises a plurality of potential applying pins that is fixed to the stem, the potential applying pins applying potential to the electrodes constituting the electrode-layered unit.

18. The radiation detecting device as claimed in claim 10, wherein the plurality of anodes is a plurality of linear anodes extending in an extending direction, the linear anodes being arranged in a direction perpendicular to the extending direction one-dimensionally.

* * * * *